(12) United States Patent
Walker et al.

(10) Patent No.: US 10,508,797 B2
(45) Date of Patent: Dec. 17, 2019

(54) LUMINAIRE AND CONNECTION MECHANISM FOR CONNECTING MULTIPLE LUMINAIRES

(71) Applicant: Cree, Inc., Durham, NC (US)

(72) Inventors: Donald Walker, Union Grove, WI (US); Qingcong Hu, Morrisville, NC (US); Boris Karpichev, Libertyville, IL (US); Andrew Bendtsen, Racine, WI (US); Kurt Wilcox, Libertyville, IL (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 121 days.

(21) Appl. No.: 15/386,700

(22) Filed: Dec. 21, 2016

(65) Prior Publication Data
US 2018/0172246 A1    Jun. 21, 2018

(51) Int. Cl.
| | |
|---|---|
| *F21V 21/005* | (2006.01) |
| *F21V 8/00* | (2006.01) |
| *F21V 23/06* | (2006.01) |
| *F21V 23/00* | (2015.01) |
| *F21S 8/06* | (2006.01) |
| *F21V 15/015* | (2006.01) |

(Continued)

(52) U.S. Cl.
CPC ............ *F21V 21/005* (2013.01); *F21S 8/061* (2013.01); *F21V 15/015* (2013.01); *F21V 23/007* (2013.01); *F21V 23/0442* (2013.01); *F21V 23/0464* (2013.01); *F21V 23/06* (2013.01); *G02B 6/0078* (2013.01); *G02B 6/0083* (2013.01); *F21S 2/00* (2013.01); *F21Y 2103/10* (2016.08); *F21Y 2115/10* (2016.08)

(58) Field of Classification Search
CPC ................................ F21V 23/06; F21V 21/005
See application file for complete search history.

(56) References Cited

U.S. PATENT DOCUMENTS

| | | |
|---|---|---|
| 8,541,795 B2 | 9/2013 | Keller et al. |
| 8,736,186 B2 | 5/2014 | Chobot |

(Continued)

FOREIGN PATENT DOCUMENTS

| | | |
|---|---|---|
| WO | 2014120968 A1 | 8/2014 |

OTHER PUBLICATIONS

U.S. Appl. No. 61/932,058, filed Jan. 27, 2014.
U.S. Appl. No. 62/292,528, filed Feb. 8, 2016.

*Primary Examiner* — Sean P Gramling
(74) *Attorney, Agent, or Firm* — Myers Bigel, P.A.

(57) ABSTRACT

A luminaire has a light emitting portion extending between first second end caps to define a length between the first end cap and the second end cap. The first end cap comprises a receptacle and the second end cap comprises a post both of which extend in an insertion direction. The receptacles are configured to closely receive the posts and the insertion direction is disposed transversely to the length. A method of assembling a luminaire assembly includes positioning a first end cap of a first luminaire over a second end cap of a second luminaire; moving the first end cap relative to the second end cap in the insertion direction; and inserting the post into the receptacle. An electrical connector on the first end cap may connect with a mating electrical connector on the second end cap to complete an electrical connection between the first luminaire and the second luminaire.

17 Claims, 34 Drawing Sheets

(51) Int. Cl.
*F21V 23/04* (2006.01)
*F21Y 103/10* (2016.01)
*F21Y 115/10* (2016.01)
*F21S 2/00* (2016.01)

(56) References Cited

U.S. PATENT DOCUMENTS

| | | | |
|---|---|---|---|
| 8,829,821 B2 | 9/2014 | Chobot et al. |
| 8,912,735 B2 | 12/2014 | Chobot et al. |
| 8,975,827 B2 | 3/2015 | Chobot et al. |
| 9,155,165 B2 | 10/2015 | Chobot |
| 9,155,166 B2 | 10/2015 | Chobot |
| 9,303,823 B2 | 4/2016 | Hu et al. |
| 9,366,396 B2 | 6/2016 | Yuan et al. |
| 9,366,799 B2 | 6/2016 | Wilcox et al. |
| 9,411,086 B2 | 8/2016 | Yuan et al. |
| 9,433,061 B2 | 8/2016 | Chobot |
| 9,442,243 B2 | 9/2016 | Tarsa |
| 9,519,095 B2 | 12/2016 | Wilcox et al. |
| 9,572,226 B2 | 2/2017 | Motley et al. |
| 9,581,751 B2 | 2/2017 | Yuan et al. |
| 2013/0328073 A1 | 12/2013 | Lowes et al. |
| 2014/0211457 A1 | 7/2014 | Tarsa et al. |
| 2014/0211462 A1 | 7/2014 | Keller et al. |
| 2014/0211495 A1 | 7/2014 | Yuan et al. |
| 2014/0211502 A1 | 7/2014 | Keller et al. |
| 2014/0268790 A1 | 9/2014 | Chobot et al. |
| 2014/0270672 A1 | 9/2014 | Durkee |
| 2015/0070882 A1* | 3/2015 | Ohno ............ F21K 9/20 362/219 |
| 2015/0102729 A1 | 4/2015 | Creasman et al. |
| 2015/0312983 A1 | 10/2015 | Hu et al. |
| 2015/0351187 A1 | 12/2015 | McBryde et al. |
| 2017/0227171 A1* | 8/2017 | May ............ F21K 9/272 |

* cited by examiner

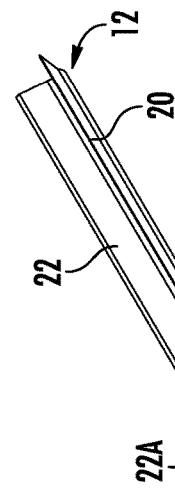
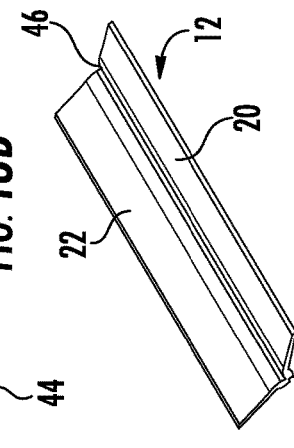
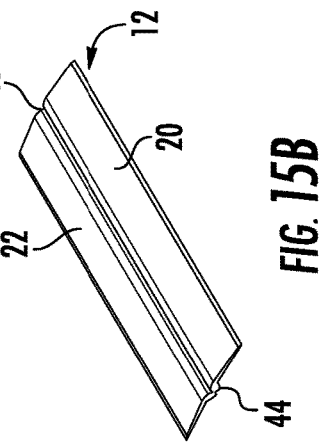
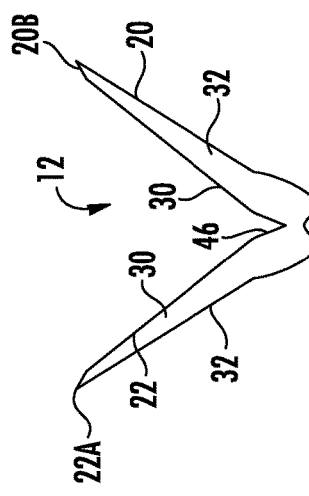
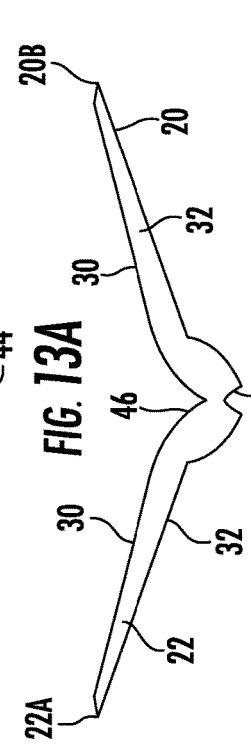
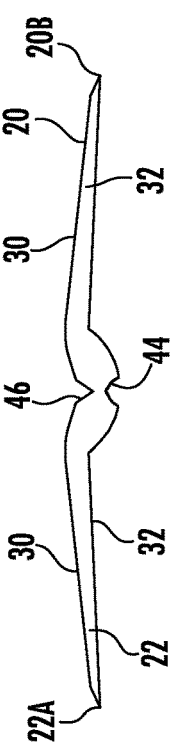

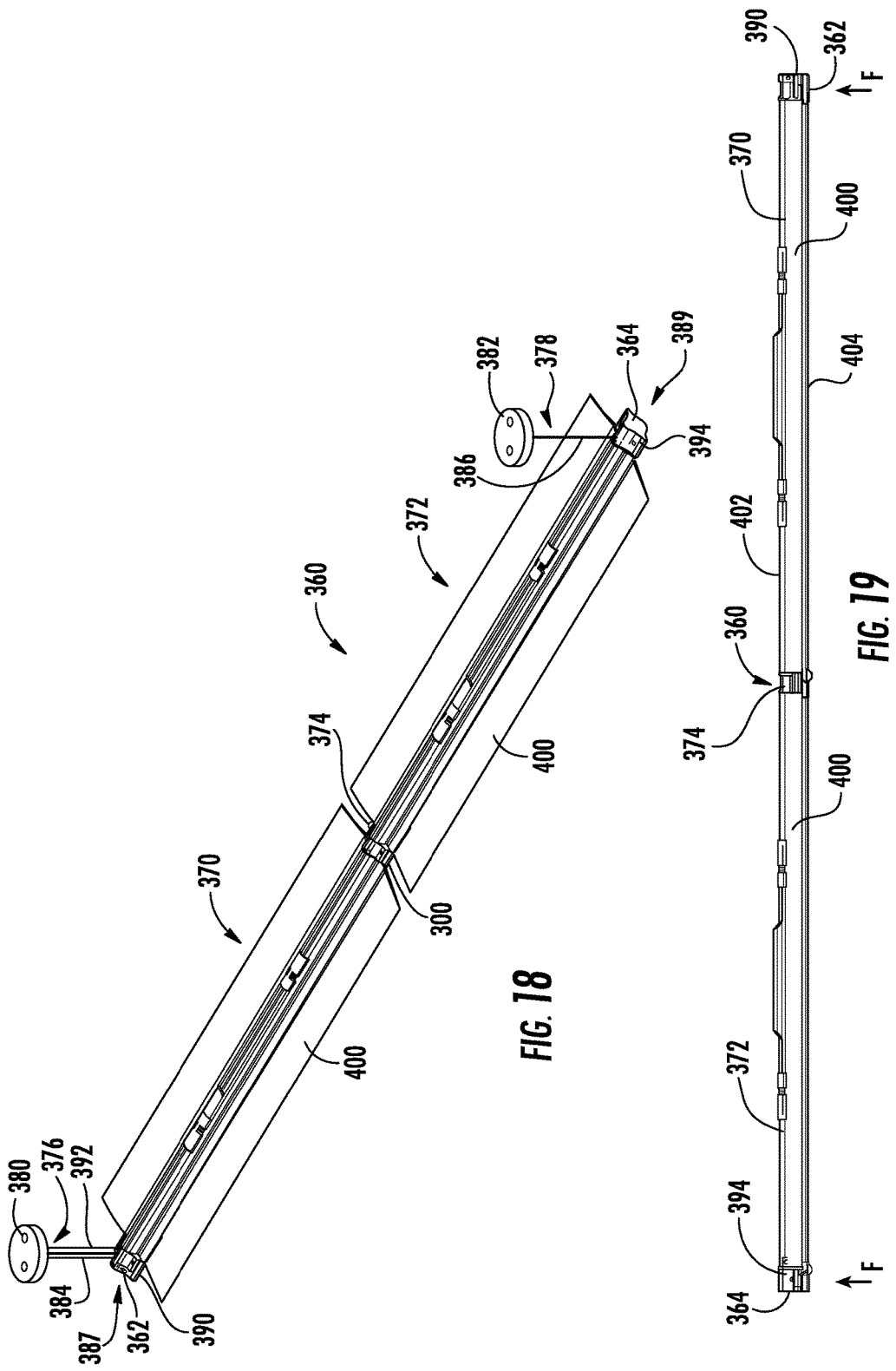

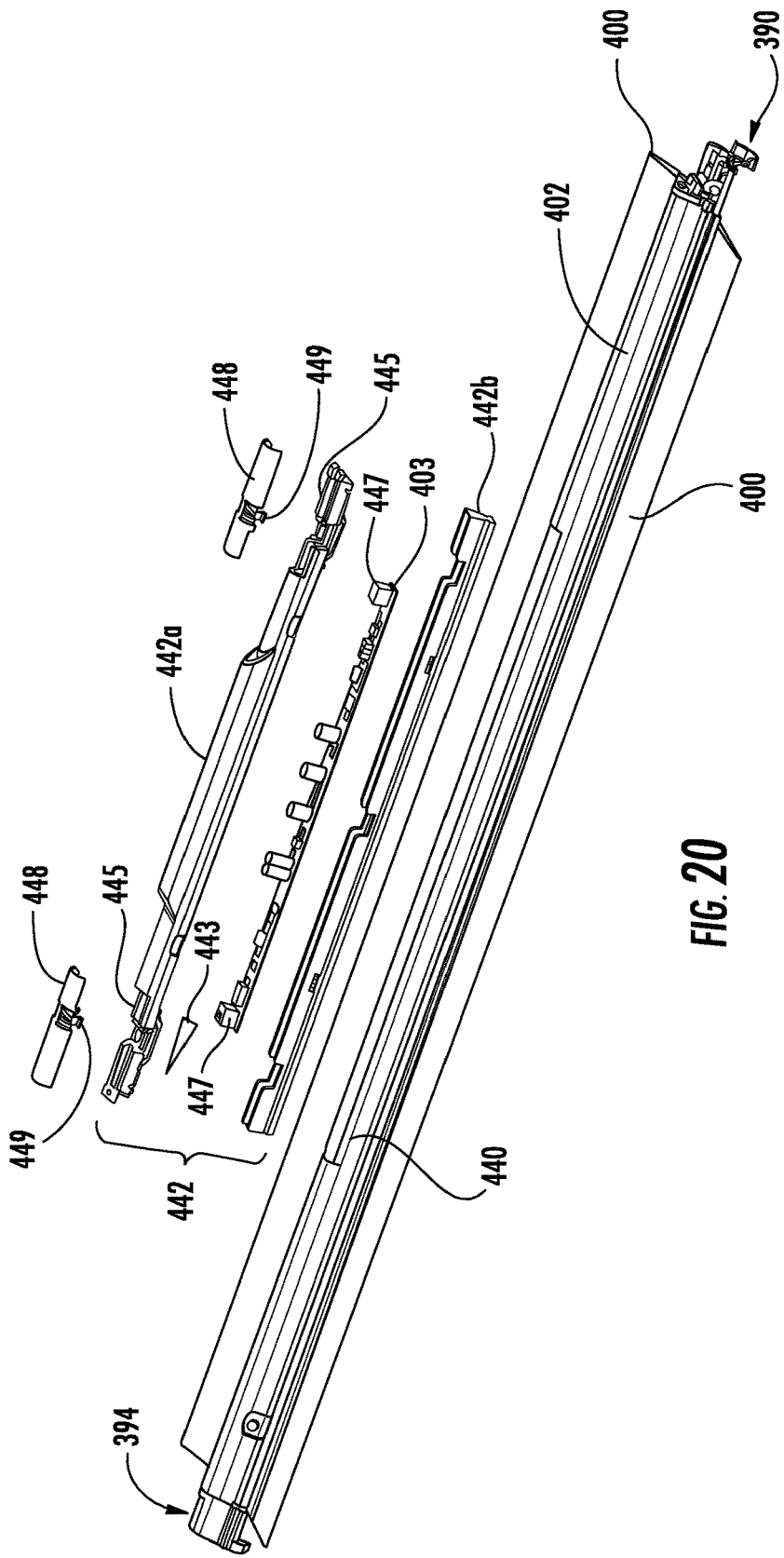

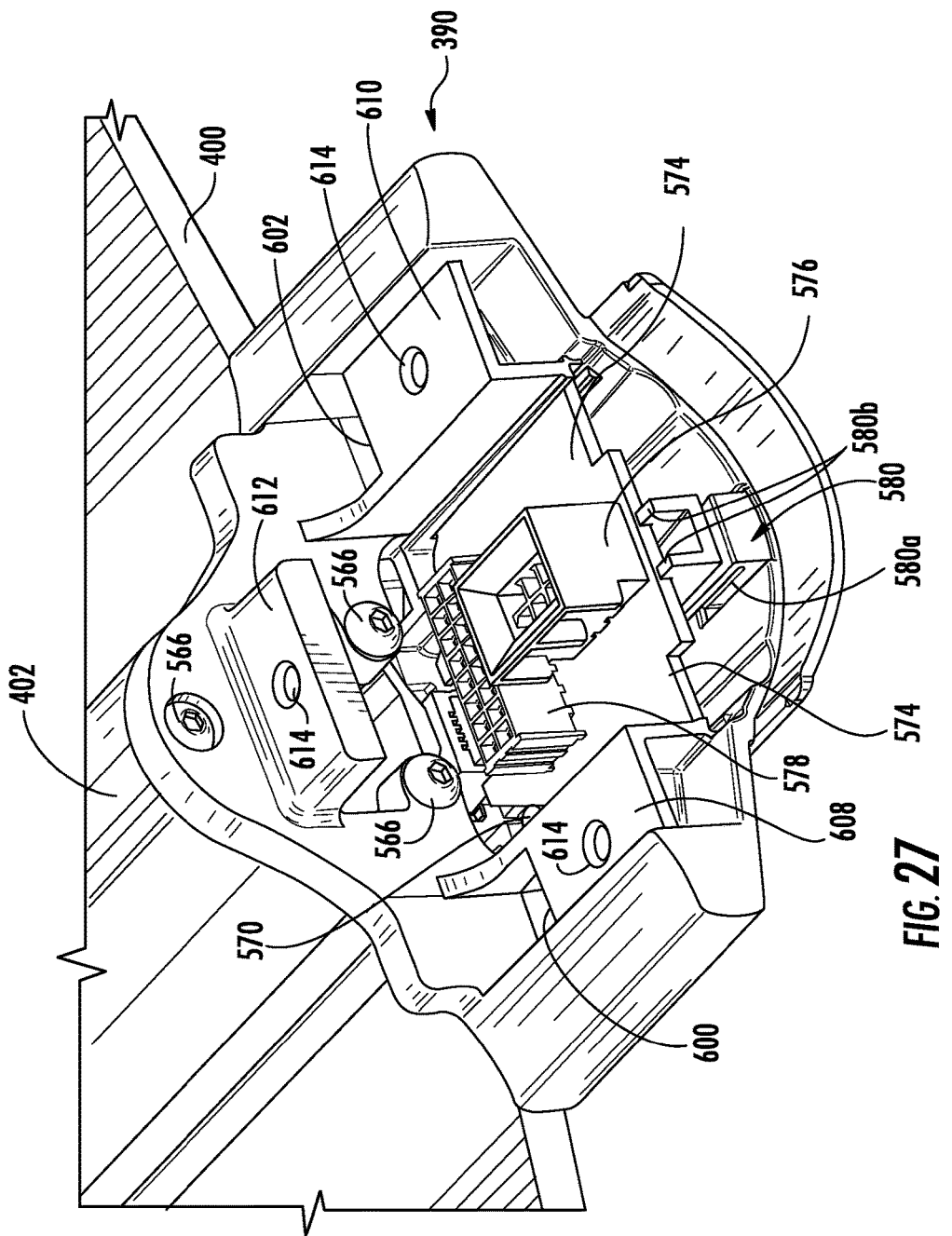

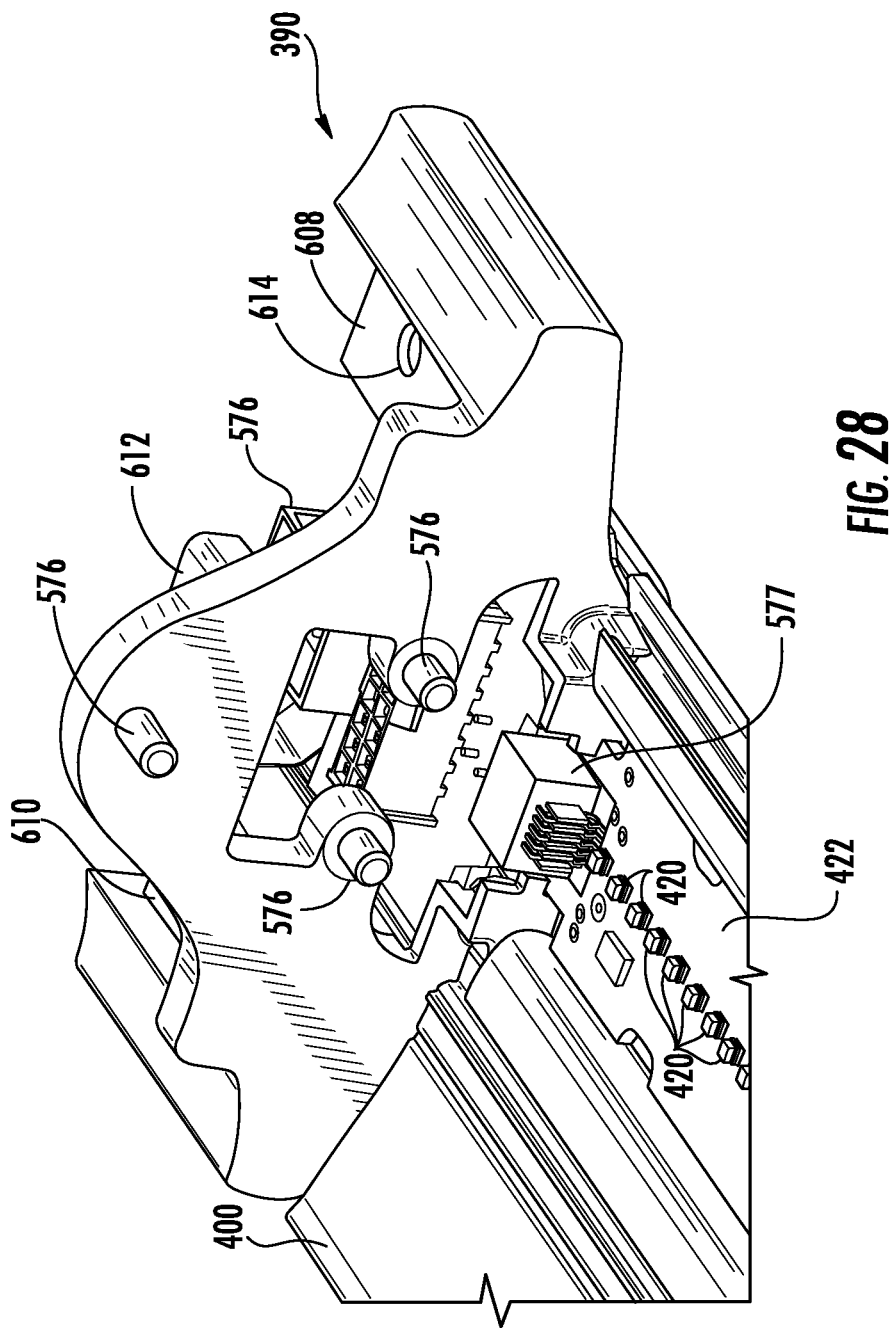

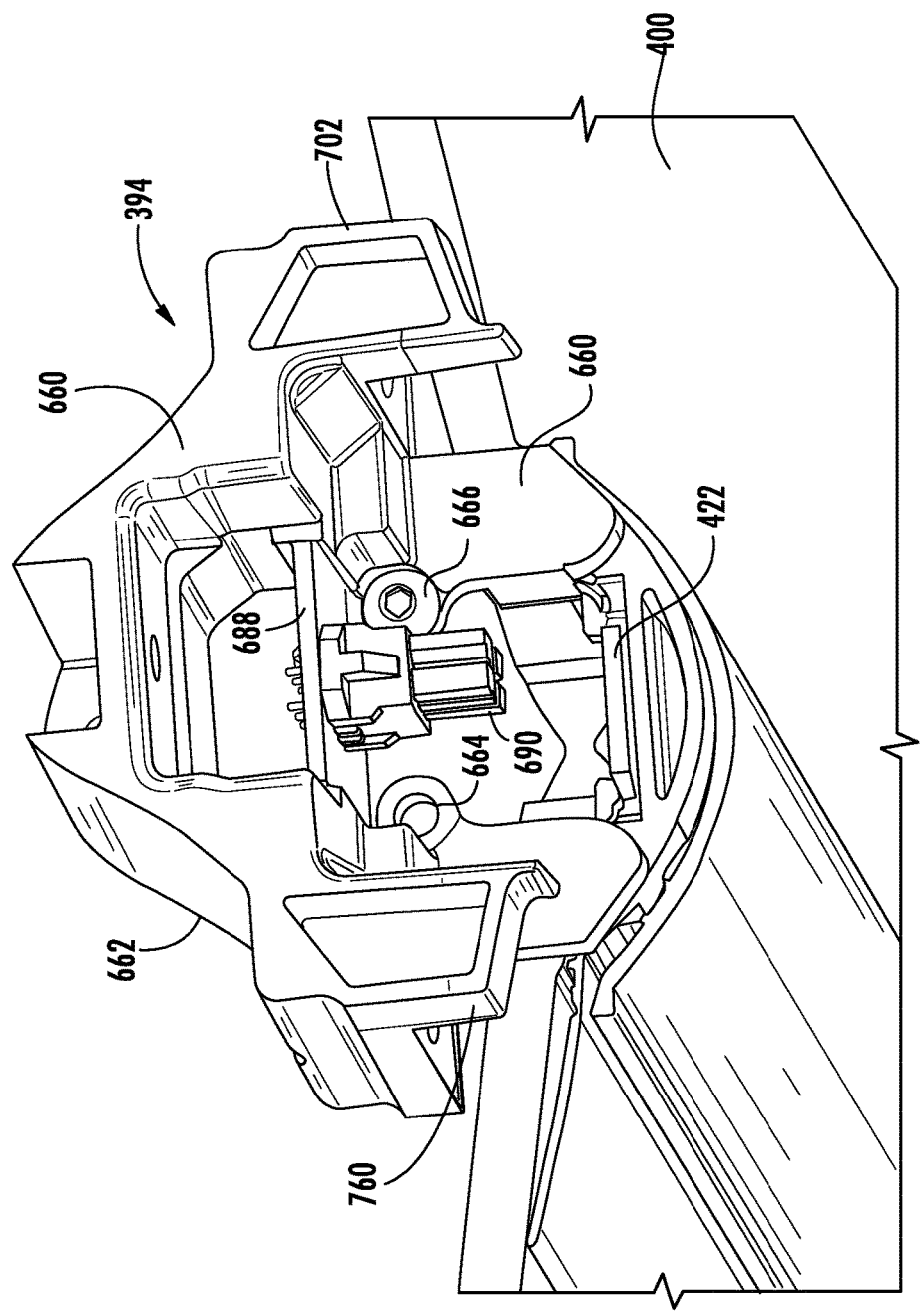

LUMINAIRE AND CONNECTION MECHANISM FOR CONNECTING MULTIPLE LUMINAIRES

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and are dependent on the waveguide geometry and material. The extraction element(s) determine how light is removed by controlling where and in what direction the light exits the waveguide A waveguide may be combined with a power supply, LED light source and structural components to create a luminaire. In one typical application the luminaire may be suspended by a support structure such as a ceiling for general illumination purposes including light that may be generated in a down light, a light that produces a wall washing effect, a task light, a troffer, or the like. Luminaires as described above may be mounted such that a plurality of luminaires are mounted in-line with one another to create a luminaire assembly having a length that is longer than the length of a single luminaire. In this manner the lighting field of the luminaire may be increased. The luminaires may be connected together in an end-to-end fashion to create a luminaire assembly of any practicable length.

SUMMARY

In one embodiment a luminaire comprises a light emitting portion extending between a first end cap and a second end cap to define a length between the first end cap and the second end cap. The first end cap has a configuration that will mate with the second end cap. The first end cap comprises at least one receptacle extending in an insertion direction and the second end cap comprises at least one post extending in the insertion direction. The receptacles are configured to closely receive the post(s) and the insertion direction is disposed transversely to the length.

The first end cap and the second end cap may be connected to a first structural member and a second structural member such that a waveguide body is disposed between the first structural member and the second structural member. The receptacle may include sidewalls that extend along the insertion direction. The first end cap may comprise a first guide surface that is configured to engage a second guide surface on the second end cap where the first guide surface and the second guide surface are disposed perpendicularly to the insertion direction. The receptacle(s), the first guide surface(s) and the second guide surface(s) may provide alignment and support along orthogonal x, y and z axes. The first end cap may comprise a first electrical connector and the second end cap may comprise a second electrical connector where the first electrical connector is configured to mate with the second electrical connector. The light emitting portion may comprise a drive circuit for the LEDs, the drive circuit containing an Ethernet port. The Ethernet port may deliver power to the drive circuit. A second Ethernet port may be spaced from the Ethernet port along the length of the light emitting portion.

In some embodiments, a luminaire assembly comprises a first luminaire having a light emitting portion extending between a first end cap and a second end cap to define a first length between the first end cap and the second end cap. A second luminaire has a light emitting portion extending between a third end cap and a fourth end cap to define a second length between the third end cap and the fourth end cap. The first end cap is configured to connect to the fourth end cap. The first end cap comprises at least one post extending in an insertion direction and the fourth end cap comprises at least one receptacle extending in the insertion direction. The insertion direction is disposed transversely to the first length and the second length.

The second end cap may be configured to mate with the third end cap. The first end cap and the third end cap may be substantially identical and the second end cap and the fourth end cap may be substantially identical. The first length and the second length may be disposed in-line with one another when the first end cap is connected to the fourth end cap. The receptacle(s) may comprise sidewalls that extend along the insertion direction. The first end cap may further comprise at least one first guide surface that is configured to engage at least one second guide surface on the fourth end cap where the at least one first guide surface and the at least one second guide surface are disposed perpendicularly to the insertion direction. A fastening mechanism may secure the first end cap to the fourth end cap. The post may be closely received in the receptacle such that a force exerted on the first luminaire and the second luminaire cants the post in the receptacle to join the first luminaire to the second luminaire due to the binding force between the receptacle and the projection.

In some embodiments a method of assembling a luminaire assembly as described above comprises positioning the first end cap over the fourth end cap; moving the first end cap relative to the fourth end cap in the insertion direction; inserting the at least one post into the at least one receptacle.

The step of inserting the at least one post into the at least one receptacle may comprise abutting at least one first guide surface on the first end cap with at least one second guide surface on the fourth end cap where the at least one first guide surface and the at least one second guide surface are perpendicular to the insertion direction. The step of inserting the at least one post into the at least one receptacle may comprise connecting an electrical connector on the first end cap with a mating electrical connector on the fourth end cap to complete an electrical connection between the first luminaire and the second luminaire.

BRIEF DESCRIPTION OF THE DRAWINGS

FIG. 13A is an end elevational view of an embodiment of a waveguide body usable in a luminaire.

FIG. 13B is an isometric view of the waveguide body of FIG. 13A.

FIG. 14A is an end elevational view of another embodiment of a waveguide body usable in a luminaire.

FIG. 14B is an isometric view of the waveguide body of FIG. 14A.

FIG. 15A is an end elevational view of still another embodiment of a waveguide body usable in a luminaire.

FIG. 15B is an isometric view of the waveguide body of FIG. 15A.

FIG. 18 is an isometric view of yet another embodiment of a luminaire.

FIG. 19 is a side elevation view of the embodiment of FIG. 31.

FIG. 20 is a partially exploded perspective view of an embodiment of a luminaire of the invention showing the drive circuit and lamp electronics housing.

FIG. 27 is a perspective view of the end cap of FIG. 26 in an assembled condition.

FIG. 28 is another perspective view of the assembled end cap of FIG. 27.

FIG. 33 is another perspective view of the assembled end cap of FIG. 32.

DETAILED DESCRIPTION

Figure 1:
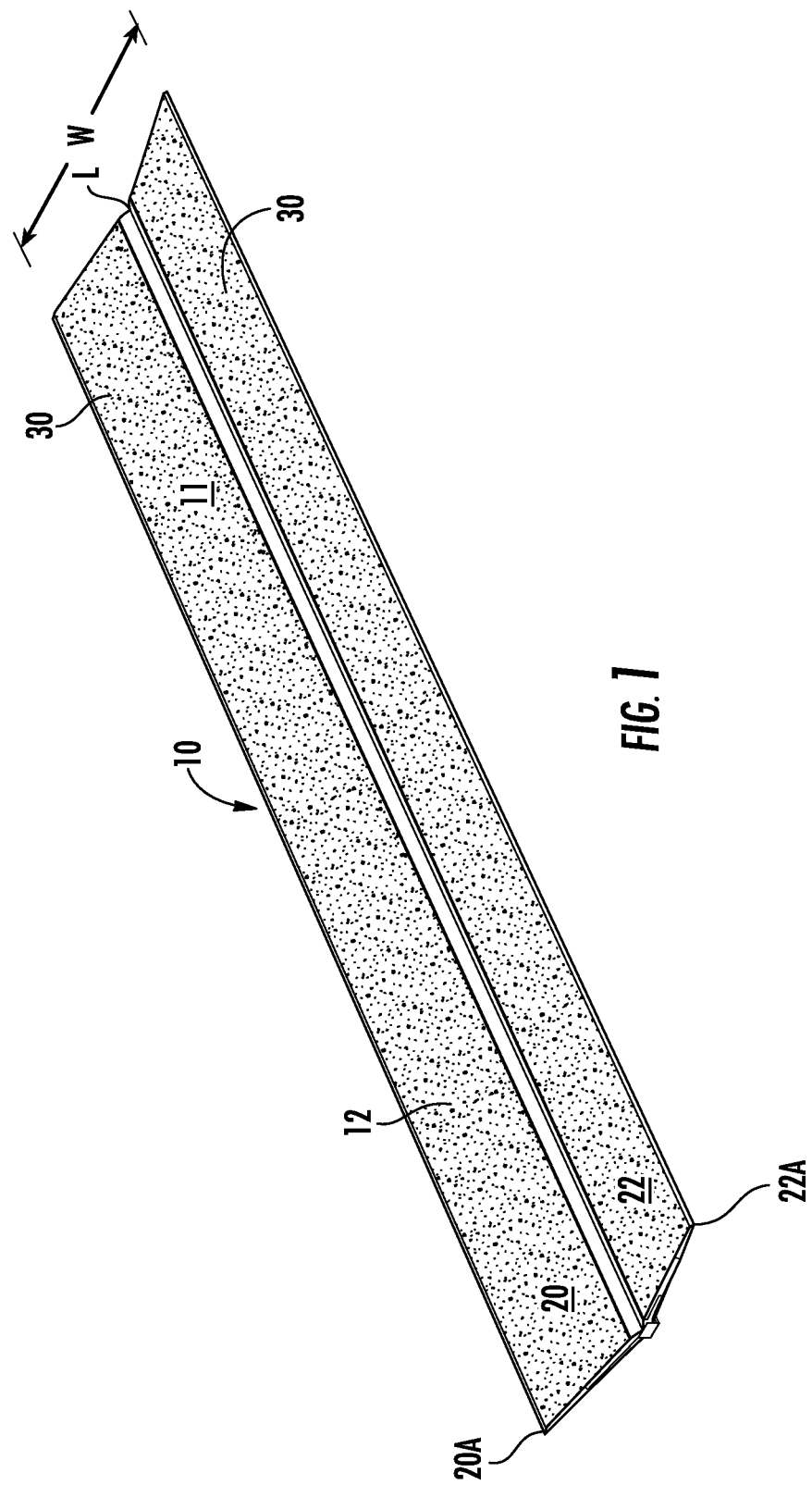
FIG. 1 is an isometric view showing an embodiment of a luminaire.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Figure 2:
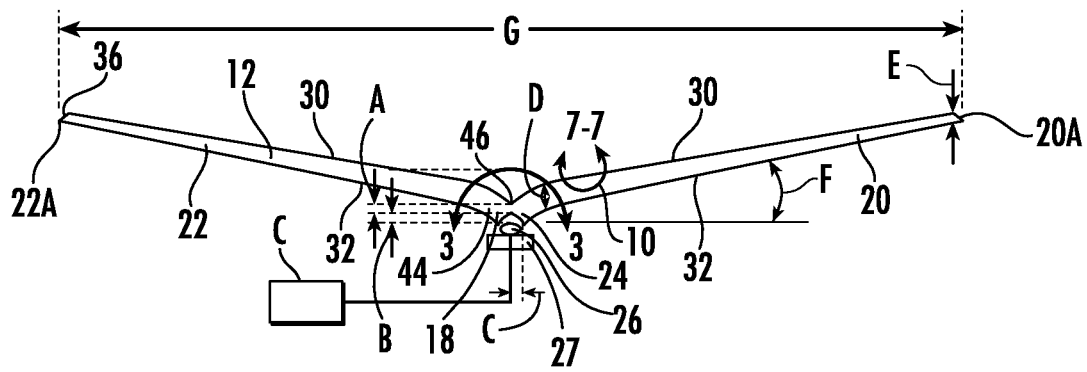
FIG. 2 is an end elevation view of the luminaire of FIG. 1.
Figure 3:
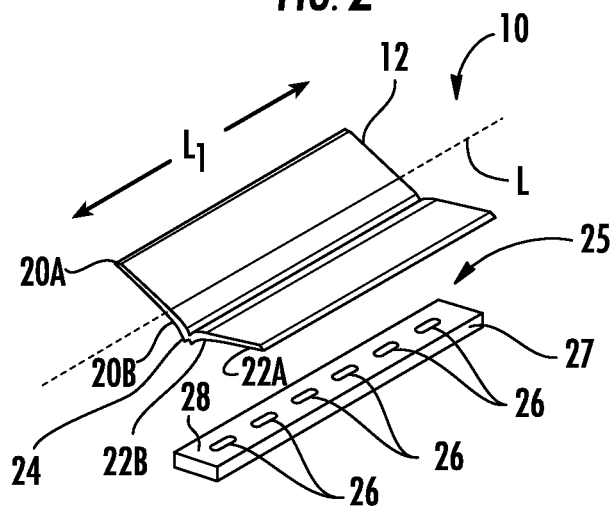
FIG. 3 is an exploded isometric view of the luminaire of FIGS. 1 and 2.

FIGS. 1-3 show a luminaire 11 comprising a waveguide 10 having a waveguide body 12 including a central section 18 and first and second separate side sections 20, 22 extending away from the central section 18 along first and second directions, respectively, and terminating at first and second outer ends 20A, 22A, respectively (FIG. 2). The side sections 20, 22 in the illustrated embodiment are preferably mirror images of one another. The central section 18 includes a coupling portion 24, and a light source 25 in the form of one or more LED element(s) 26 that are disposed adjacent the coupling portion 24. The light source 25 is adapted to produce light that is directed into the waveguide body 12 via the coupling portion 24. A drive circuit or driver C provides power to the light source 25. The drive circuit may also include the controller for controlling operation of the luminaire, including communicating with other luminaires, controllers, sensors and the like. The waveguide body 12 includes a plurality of light extraction features 14 (FIG. 7) that extract light out of the side sections 20, 22. In some embodiments the waveguide body 12 may be made of a transparent acrylic.

More specifically, as seen in FIG. 3, the light source 25 includes a base element in the form of a substrate 27 having a base surface 28. If desired, the base surface 28 may be covered or coated by a reflective material, which may be a white material or a material that exhibits specular reflective characteristics. LED elements 26 are mounted on the base surface 28. The substrate 27 is secured in fixed relation to the waveguide body 12 in any suitable fashion. The LED elements 26 may preferably be equally spaced along a longitudinal axis L and further extend into a cavity 29 (FIG. 4) of the coupling portion 24. Each LED element 26 may be a single white LED or multiple white LEDs or each may comprise multiple LEDs either mounted separately or together on a single substrate or package including a phosphor-coated LED either alone or in combination with a color LED, such as a green LED, etc. In those cases where a soft white illumination is to be produced, each LED element 26 typically includes one or more blue shifted yellow LEDs and one or more red LEDs. Different color temperatures and appearances could be produced using other LED combinations, as is known in the art. In one embodiment, the light source comprises any LED, for example, an MT-G LED module incorporating TrueWhite® LED technology developed by Cree, Inc. or as disclosed in U.S. patent application Ser. No. 13/649,067, filed Oct. 10, 2012 entitled "LED Package with Multiple Element Light Source and Encapsulant Having Planar Surfaces" by Lowes et al., the disclosure of which is hereby incorporated by reference herein in its entirety. In any of the embodiments disclosed herein the LED(s) have a particular emission distribution, as necessary or desirable. For example, a side emitting LED disclosed in U.S. Pat. No. 8,541,795, issued Sep. 24, 2013, entitled "Side-Emitting Optical Coupling Device" the disclosure of which is incorporated by reference herein in its entirety, may be utilized inside the waveguide body. More generally, any lambertian, symmetric, wide angle, preferential-sided, or asymmetric beam pattern LED(s) may be used as the light source. Still further, any of the LED arrangements and optical elements disclosed in co-pending U.S. patent application Ser. No. 14/101,147, filed Dec. 9, 2013, entitled "Luminaires Using Waveguide Bodies and Optical Elements" by Keller et al., incorporated by reference herein in its entirety, may be used.

The power circuit C may be disposed on the substrate 27 or may be located remotely, or a portion of the power circuit C may be disposed on the substrate and the remainder of the power circuit C may be remotely located. In any event, the power circuit C is designed to operate the light source 25 with AC or DC power in a desired fashion to produce light of a desired intensity and appearance. If necessary or desirable, a heat exchanger (not shown) is arranged to dissipate heat and eliminate thermal crosstalk between the LEDs and the power circuit C. Preferably, the light source 25 develops light appropriate for general illumination purposes including light that may be generated in a down light, a light that produces a wall washing effect, a task light, a troffer, or the like. The power circuit C may include a buck regulator, a boost regulator, a buck-boost regulator, a SEPIC power supply, or the like, and is used in any of the embodiments disclosed herein and may comprise a driver circuit as disclosed in U.S. patent application Ser. No. 14/291,829, filed May 30, 2014, entitled "High Efficiency Driver Circuit with Fast Response" by Hu et al. or U.S. Pat. No. 9,303,823, issued Apr. 5, 2016, entitled "SEPIC Driver Circuit with Low Input Current Ripple" by Hu et al. both of which are incorporated by reference herein in their entirety. The circuit C may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein in its entirety.

Figure 9:
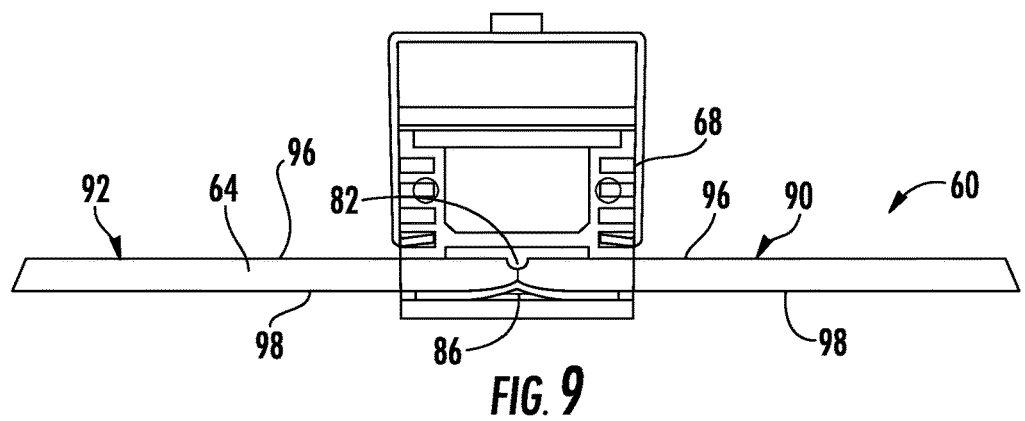
FIG. 9 is an end elevational view of a luminaire that is a modified version of that shown in FIG. 8 with an end cap removed.

In the embodiment of FIGS. 1-3 each of the first and the second side sections 20, 22 has an upper and a lower surface 30, 32 and include an inner end 20B, 22B proximal to the coupling portion 24 and an outer end 20A, 22A, respectively, distal to the coupling portion 24. The inner end 20B, 22B has a first thickness D, the outer end 20A, 22A has a second thickness E, and the first thickness D is greater than the second thickness E, and hence, the side sections 20, 22 are tapered. In still another embodiment, a flat waveguide body 12 is used in which the inner thickness is equal to the outer thickness as shown in FIG. 9.

Figure 17:
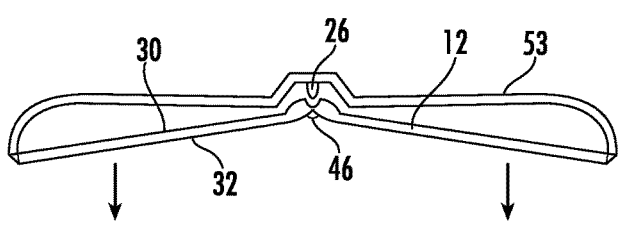
FIG. 17 is a side elevation view of an embodiment of a luminaire disclosed in the application and a reflector opposite one side of the luminaire.

In one embodiment, as shown in FIG. 17, a reflector 53 may be placed above the upper surface 30 of the waveguide 12. If desired, the reflector 53 can be replaced by a specular or reflective coating disposed on the surface 30.

Figure 7:
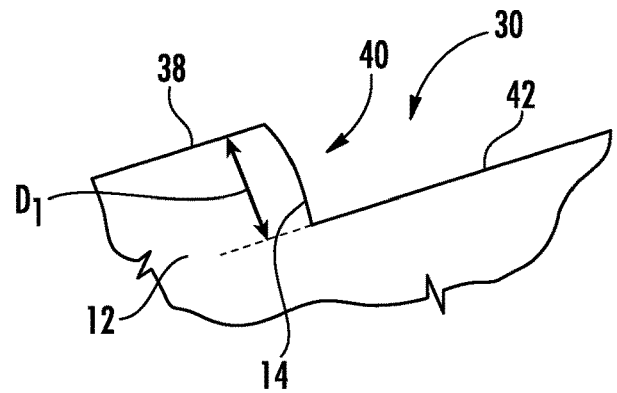
FIG. 7 is an enlarged, fragmentary side elevational view of an extraction feature as referenced by the view line 7-7 of FIG. 2.

Also in the illustrated embodiment of FIGS. 1-3, the coupling portion 24 extends away from the LED elements 26 toward one or both of the second ends 20A, 22A. The upper surface 30 of the first and second sections 20, 22 may be textured as shown in stippling in FIG. 1. Each textured surface 30 may comprise a plurality of light extraction features 14, one of which is shown in FIG. 7. In a more particular embodiment, each of the plurality of light extraction features 14 comprises an intermediate surface 40 that extends from a first surface 38 to a second surface 42. All or some of the intermediate surfaces 40 may be planar or curved. Each first surface 38 is displaced from an associated adjacent second surface 42 by a particular distance $D_1$, as shown in FIG. 7, wherein the distances $D_1$ may be constant or vary along the length and width of each surface 30. The disposition of the center of the radius of curvature, the magnitude of the radius of curvature, and the arcuate extent of each intermediate surface 40 affect the distribution of light from the waveguide body 12. In another embodiment, the intermediate surfaces 40 may be planar, and the intermediate surfaces 40 may be parallel to one another, although the surfaces 40 need not all be planar or parallel. It should also be noted that the extraction features may be of differing size, shape, and/or spacing over the surface(s) of the waveguide body 12 so that an asymmetric emitted light distribution is obtained. For example, the extraction features may include a combined notch and step extraction that leads to a tapered edge. Additionally, as seen in co-pending U.S. patent application Ser. No. 14/101,086, filed Dec. 9, 2013, entitled "Optical Waveguides and Luminaires Incorporating Same" by Keller et al., which is incorporated by reference herein in its entirety, the extraction features may comprise small indents or protrusions and a relatively large number of such extraction features may be disposed asymmetrically relative to the coupling portion 24. In another embodiment, the lower surface 32 may be textured. This texturing may be effected by a roughened surface that creates a diffusion effect, and/or by a plurality of extraction features 14. These extraction features 14 may be identical or similar to those described above.

Figure 4:
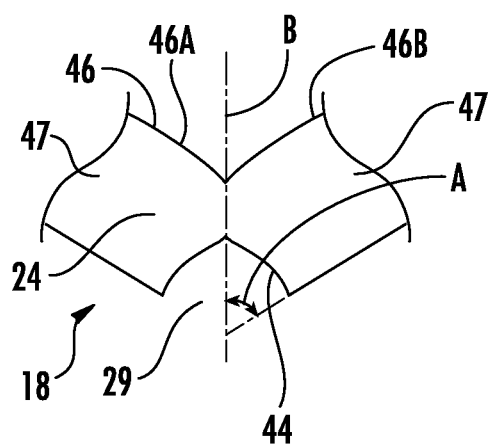
FIG. 4 is an enlarged, fragmentary side elevational view of the central section as referenced by the view lines 3-3 of FIG. 2.
Figure 11:
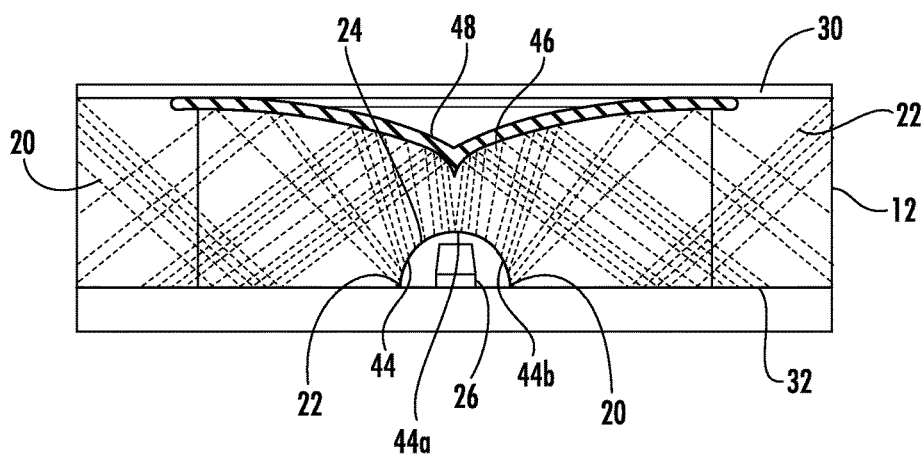
FIG. 11 is an enlarged, fragmentary cross sectional view of an embodiment of a central section of a waveguide body and a mirrored top reflector opposite the light source.
Figure 12:
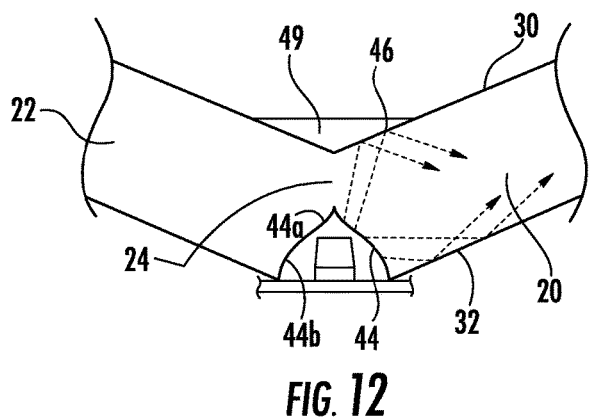
FIG. 12 is an enlarged, fragmentary end view of a central section showing a specular reflective body located opposite the light source.
Figure 16:
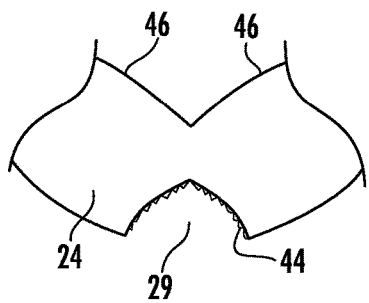
FIG. 16 is a side elevation view of an embodiment of a central section of a waveguide disclosed in the application showing a textured surfaces.

As shown in FIG. 4, the coupling portion 24 has a concave first surface 44 defining the cavity 29 and a curved V-shaped second surface 46 disposed opposite the concave first surface 44. The concave surface 44 and/or second surface 46 may be textured so as to allow for better color mixing of the light, as shown in FIG. 16. In one embodiment, the V-shaped second surface 46 is smooth and uncoated. In an alternative embodiment seen in FIG. 11, an optional layer of specular material 48 is disposed on the V-shaped second surface 46. In still another version of the embodiment seen in FIG. 12, an optional specular reflective body 49 is located in the V-shaped convergence between the first and second sides 20, 22. The material 48 or the body 49 may be used in any of the embodiments discussed herein.

Figure 5:
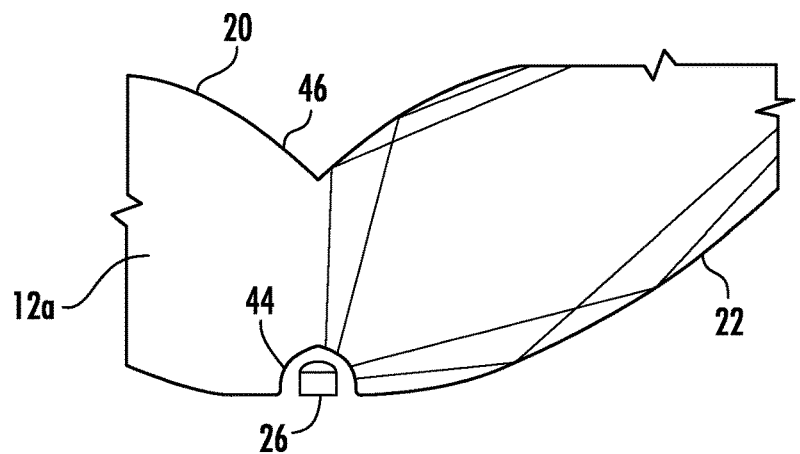
FIG. 5 is an enlarged, fragmentary side elevation of a central section.
Figure 6:
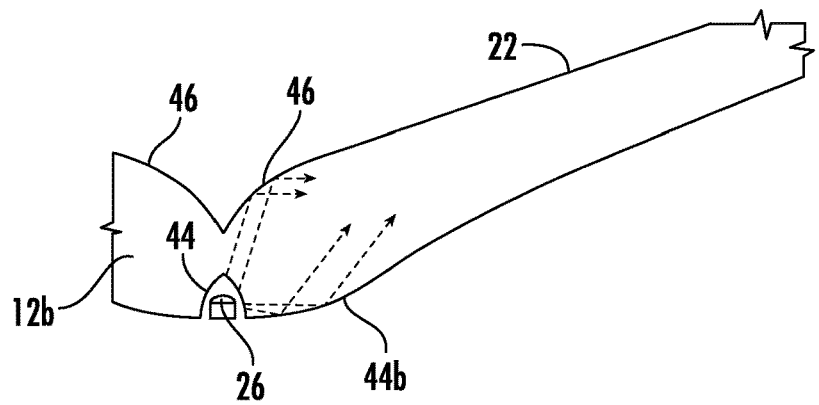
FIG. 6 is an enlarged, fragmentary side elevation of another central section.

While redirecting rays of a light source 26 into one or more ray groups or beams each having a ray angle distribution range typically requires an optic substantially larger than the light source, such redirection can also be accomplished by using a thick waveguide body 12a, as shown in FIG. 5. However, it may be preferable for costs reasons to undertake such light redirection using a relatively thin waveguide body 12b as shown in FIG. 6. Light developed by the light source 26 can be redirected into two independent sets of light rays. Each set of rays have a very narrow distribution range or may be substantially or fully collimated in order to achieve the desired light distribution out of the waveguide 10. Specifically, and with reference to FIGS. 5, 6 and 12, the primarily lambertian distribution of light developed by the LED element(s) 26 is incident on the walls defining the concave surface 44, and light incident on an upper surface 44a travels through the coupling portion 24 and strikes the curved V-shaped second surface 46. The second surface 46 redirects the light by TIR (and/or specular reflection if the material 48 on the body 49 is present) into the sides 20, 22 that bounce due to total internal reflection between the upper and lower surfaces 30, 32 until such rays exceed the critical angle of the material of the waveguide body 12 and escape. Light incident on lower surfaces 44b of the concave surface 44 may travel through the coupling portion 24 directly into the portions 20, 22 without striking the curved V-shaped second surface 46. The light also bounces between the upper and lower surfaces 30, 32 until such rays exceed the critical angle of the material of the waveguide body 12 and escape. The extraction features 14 cause the light to exit the waveguide 12 in a controlled fashion such that light is directed out of the upper and lower surfaces 30, 32. Because the light rays are at least substantially collimated they experience minimal spreading as they propagate through the waveguide body 12. This results in highly controlled beams which can be either extracted in a collimated fashion, or spread into a wide distribution.

The collimated light rays repeatedly bounce through the guide 12 by total internal reflection until they strike an extraction feature 14 and are redirected into the waveguide 12 or escape into the space or room to be illuminated. The light that strikes the extraction features 14 and is reflected back into the waveguide body 12 may strike the opposing waveguide body surface and escape out of the waveguide body 12 or may further reflect off the opposing surface and continue to travel within the waveguide body 12, depending upon the incident angle of the light striking such opposing surface. The light eventually leaves the waveguide body 12, preferably before reaching outer ends 20A, 22A. This escape is facilitated by the extraction features 14 which may have stepped surfaces parallel to one another.

Figure 8:
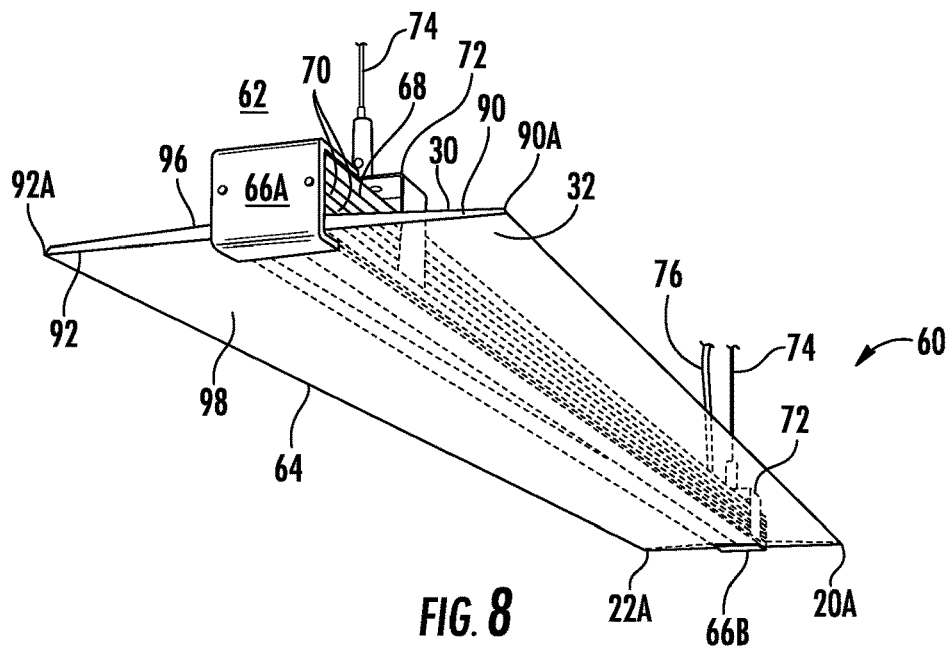
FIG. 8 is a perspective of a further embodiment of a luminaire.
Figure 10:
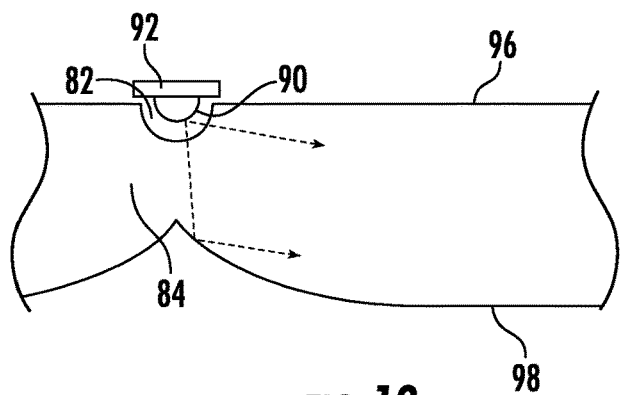
FIG. 10 is an enlarged, fragmentary side elevational view of the central section of the waveguide body of FIG. 9.

FIGS. 8-10 illustrate another embodiment as assembled into a complete luminaire 60 suspended from a ceiling or other structure. A waveguide body 64 is disposed between end caps 66A, 66B that are, in turn, secured to a housing 68. The housing 68 encloses a driver circuit, although the driver circuit may be disposed at another location. Also, the housing 68 may be made of a thermally conductive material, such as aluminum, and may include heat dissipating structures 70 that radiate heat away from the driver circuit components. The housing 68 may be suspended by brackets 72 and wire rope, cable, rods, or the like 74 from appropriate ceiling mounting structures, as is conventional. The luminaire 60 may receive electrical power via an electrical connection cord 76.

The waveguide body 64 may be oriented in any direction (e.g., horizontally, vertically, or diagonally). As seen in FIGS. 8 and 9, the waveguide body 64 is inverted (i.e., flipped over) relative to the waveguide body 12 of FIG. 1. Thus, a cavity 82 similar or identical to the cavity 29 of a coupling portion 84 that is similar or identical to the coupling portion 24 is disposed above a V-shaped curved surface 86 similar or identical to the V-shaped surface 46. As in the previous embodiment, the V-shaped surface may be smooth and uncoated, or may be coated with a specular material or a specular reflective body may disposed adjacent and abutting the V-shaped surface 86 as in the previous embodiments. LED element(s) 90 mounted on a substrate 92 may be secured relative to the waveguide body 64 such that the LED element(s) extend into the cavity 82. The waveguide body 64 otherwise differs from the waveguide body 12 in that side sections 90, 92 corresponding to the side sections 20, 22 are disposed substantially 180 degrees relative to one another, extraction features (not shown) similar or identical to any of the extraction features 14 disclosed herein are disposed in surfaces 96 and/or 98. Surfaces 98 opposite the surfaces 96 may have a greater lateral extent than the surfaces 96. The surfaces 96 may be smooth, although such surfaces may be textured as previously described.

As shown in the various embodiments of the Figures, the side sections of the waveguide body 12, 64 may be disposed at any angle A relative to an axis B (FIG. 3) lying in a plane normal to the longitudinal axis L and bisecting the coupling portion 24. More preferably, this angle A is between about 45° and about 135°. Example embodiments of the waveguide body having various angles A are illustrated in FIGS. 13A-15B.

A further description of a waveguide and luminaire utilizing a waveguide is disclosed in U.S. Pat. No. 9,366,799, issued Jun. 14, 2016, entitled "Optical Waveguide Bodies and Luminaires Utilizing Same" the disclosure of which is incorporated by reference herein in its entirety.

FIGS. 18-19 illustrate yet another embodiment of a luminaire assembly 360 configured to be suspended from a ceiling. The luminaire assembly 360 includes one or more luminaires 370, 372 that are assembled together in end to end fashion as noted in greater detail hereinafter. The luminaires may be identical and, while the drawings illustrate the use of two luminaires, any number of luminaires may be joined together to obtain a luminaire assembly of desired length. The luminaire assembly 360 is suspended at two ends 387, 389 thereof. The luminaire 360 may be suspended from or mounted to any surface other than a ceiling, including a vertical or horizontal or inclined surface, and that the luminaire may have at least one, and preferably more than one suspension or mounting points located at the ends and/or intermediate portions of the luminaire 360. The luminaire assembly may receive power for all of the luminaires from a single source or each luminaire in the luminaire assembly may receive power independently of the other luminaires.

The illustrated luminaire assembly 360 includes first and second luminaires 370, 372 that are joined together at an intermediate coupling 374. First and second suspension members 376, 378 include mounting plates 380, 382, respectively, adapted to be mounted to ceiling junction boxes (not shown) and cables 384, 386, respectively, that are secured to the luminaire 360. End caps 390, 394 secured at the ends of each of the luminaires are used to join the luminaires together at intermediate coupling 374 to create a luminaire assembly 360. The exposed end caps may be covered by end cap covers 362, 364 to close the end caps when the end caps are not connected at a coupling 374.

Referring to FIGS. 20-33, the luminaire 370 is hereinafter described in detail, it being understood that the luminaire 372 is identical thereto. The luminaire 370 includes a waveguide body 400, a first structural member 402 disposed on a first side of the waveguide body 400, and a second structural member 404 disposed on a second side of the waveguide body opposite the first side. Preferably, each of the first and second structural members 402, 404 may be made as hollow members of extruded aluminum, although any suitable material or combinations of materials could be used. The first and second structural members 402, 404 and the waveguide body 400 are secured to one another by fixing the waveguide body 400 between the first and second structural members 402, 404 and securing the first and second structural members in position using the end caps 390, 394. The waveguide body 400, first structural member 402 and a second structural member 404 may be considered a light emitting portion of the lamp that extends between the end caps 390, 394. The light emitting portion extends for a length between the end caps to define a length of the light emitting portion.

A plurality of LEDs 420 as described in connection with the preceding embodiments are disposed on a circuit board 422 carried by the second structural member 404 (FIG. 28). The LEDs 420 extend into the coupling cavity 424 of the waveguide body 400 as described herein.

Figure 21:
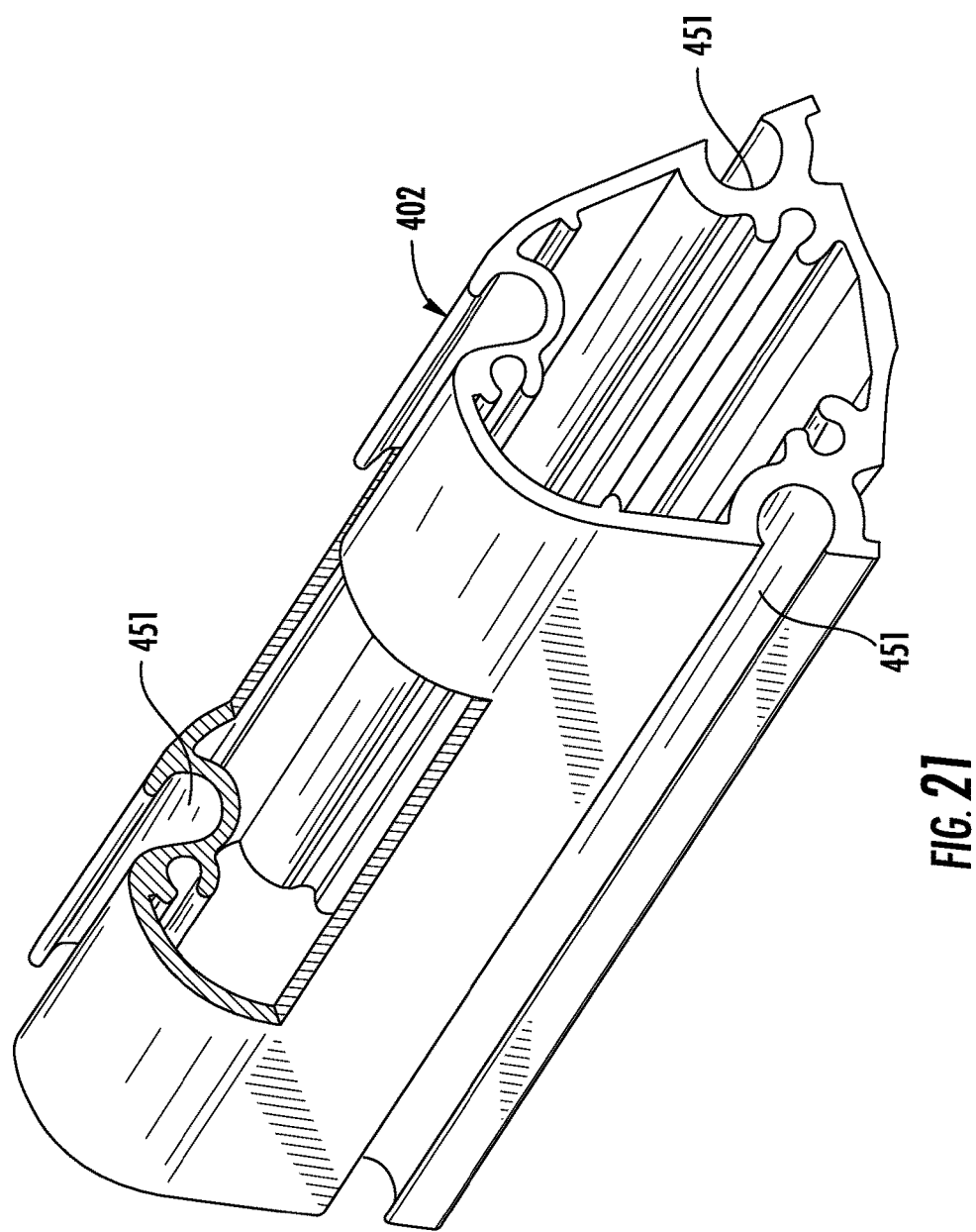
FIG. 21 is a partial perspective view of the upper structural member of the luminaire of FIG. 20.
Figure 22:
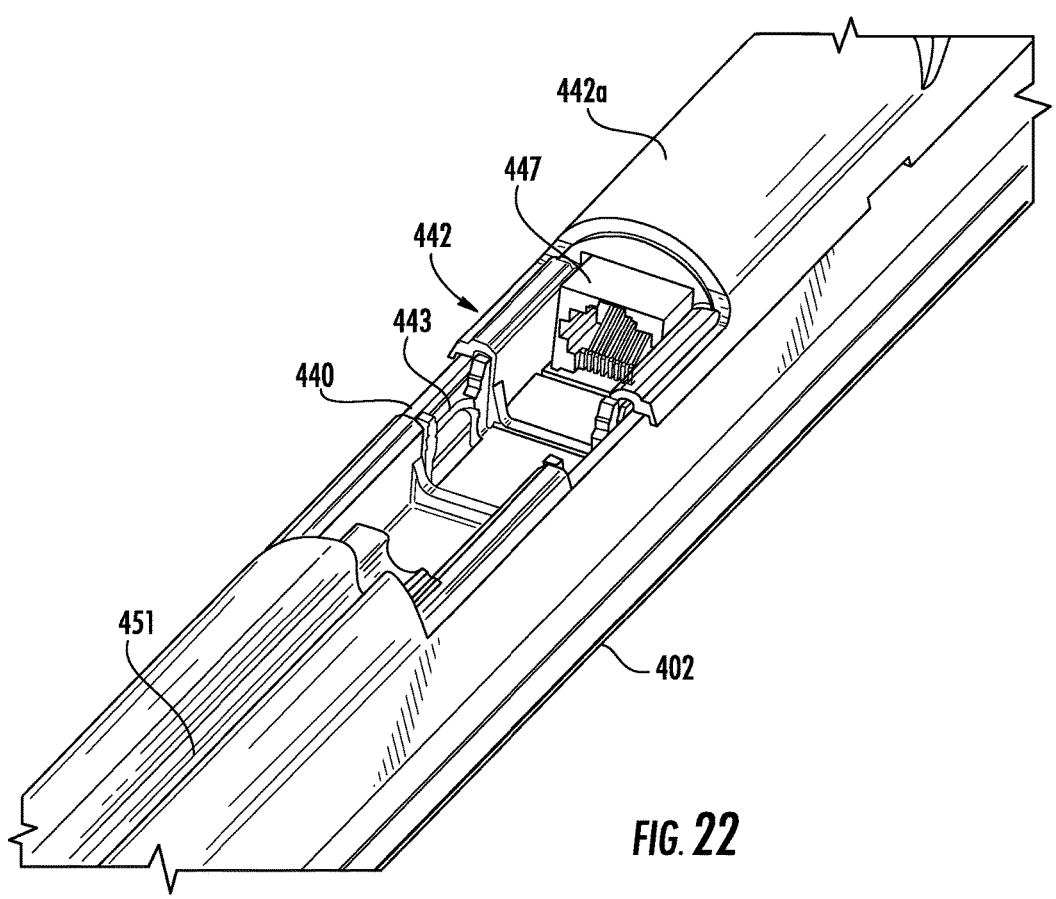
FIG. 22 is a partial perspective view of the Ethernet port in the lamp electronics housing and mounted in the upper structural member of the luminaire of FIG. 20.
Figure 23:
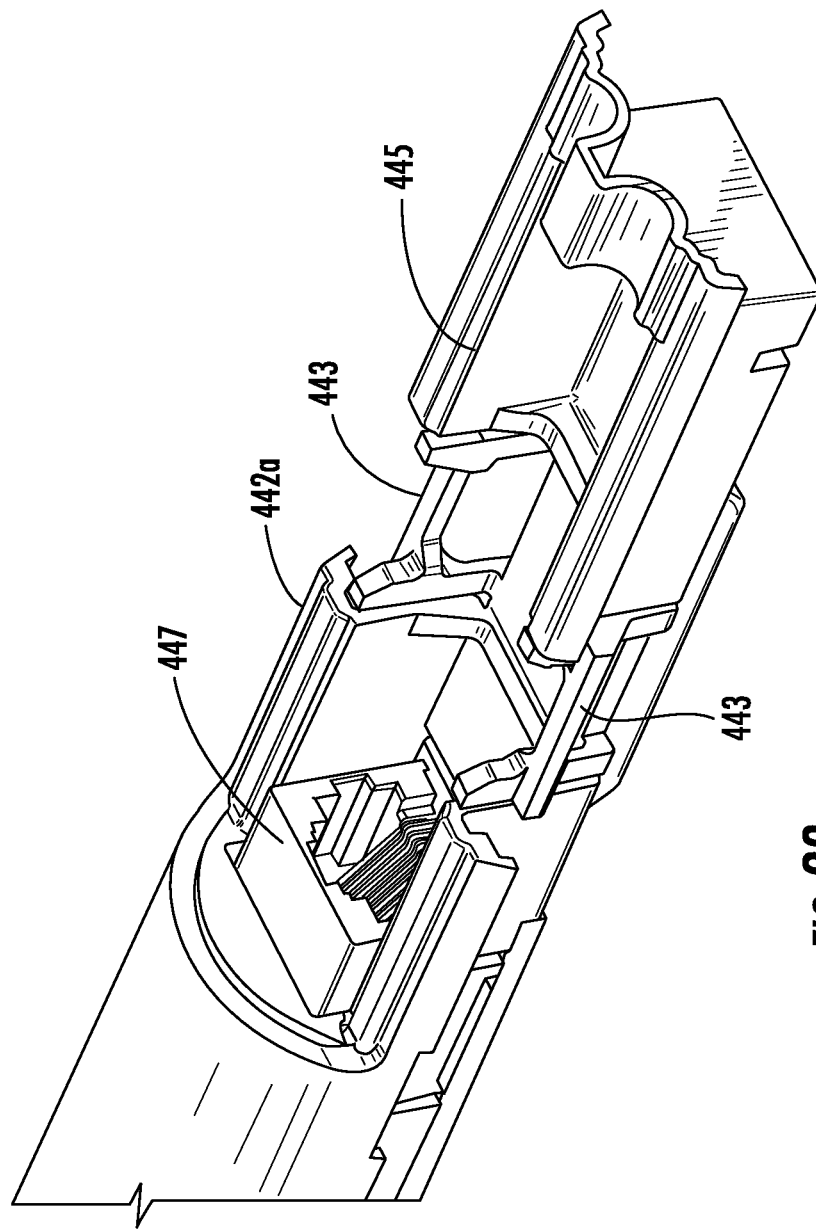
FIG. 23 is a partial perspective view of the lamp electronics housing of the luminaire of FIG. 20.
Figure 24:
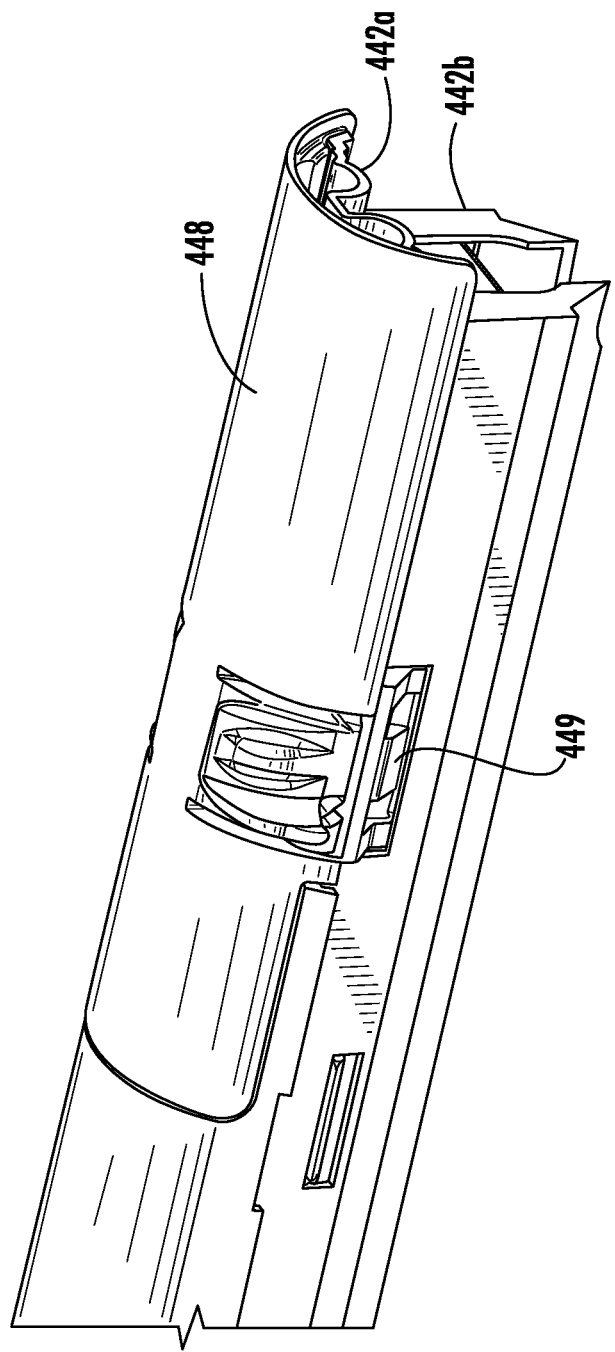
FIG. 24 is a partial perspective view of the lamp electronics housing and cover of the luminaire of FIG. 20.
Figure 25:
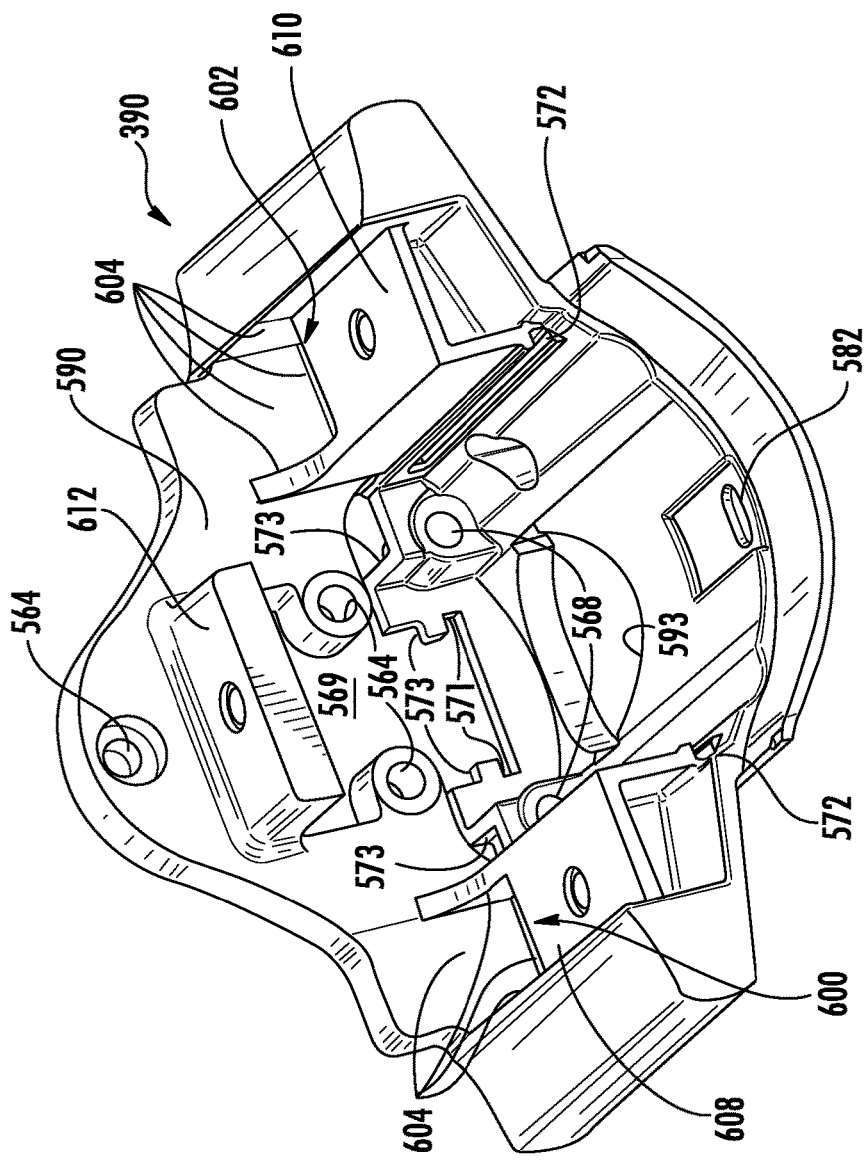
FIG. 25 is a perspective view of one end cap of the luminaire of FIG. 20.
Figure 26A:
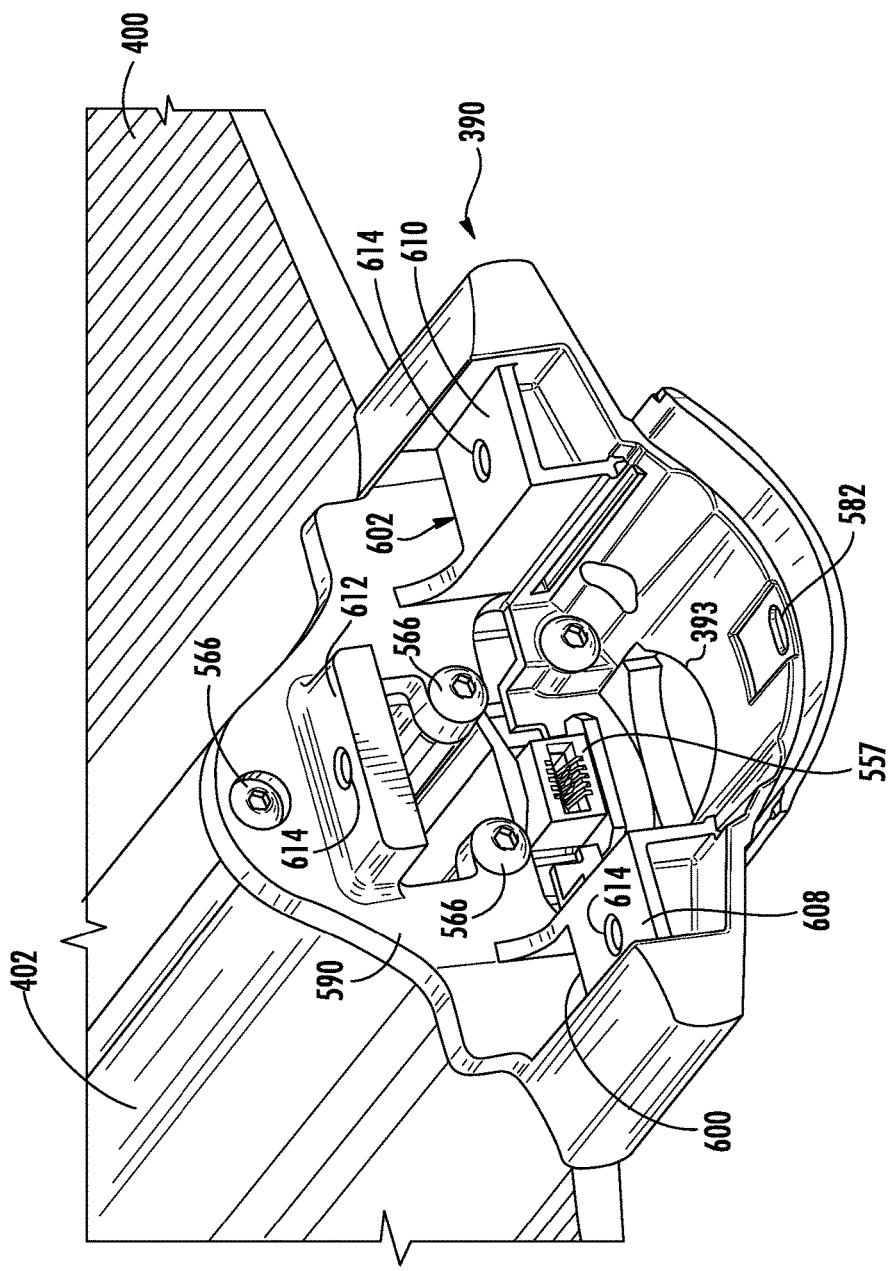
FIGS. 26A-26E show one end cap of the luminaire of FIG. 20 in various stages of assembly.
Figure 26B:
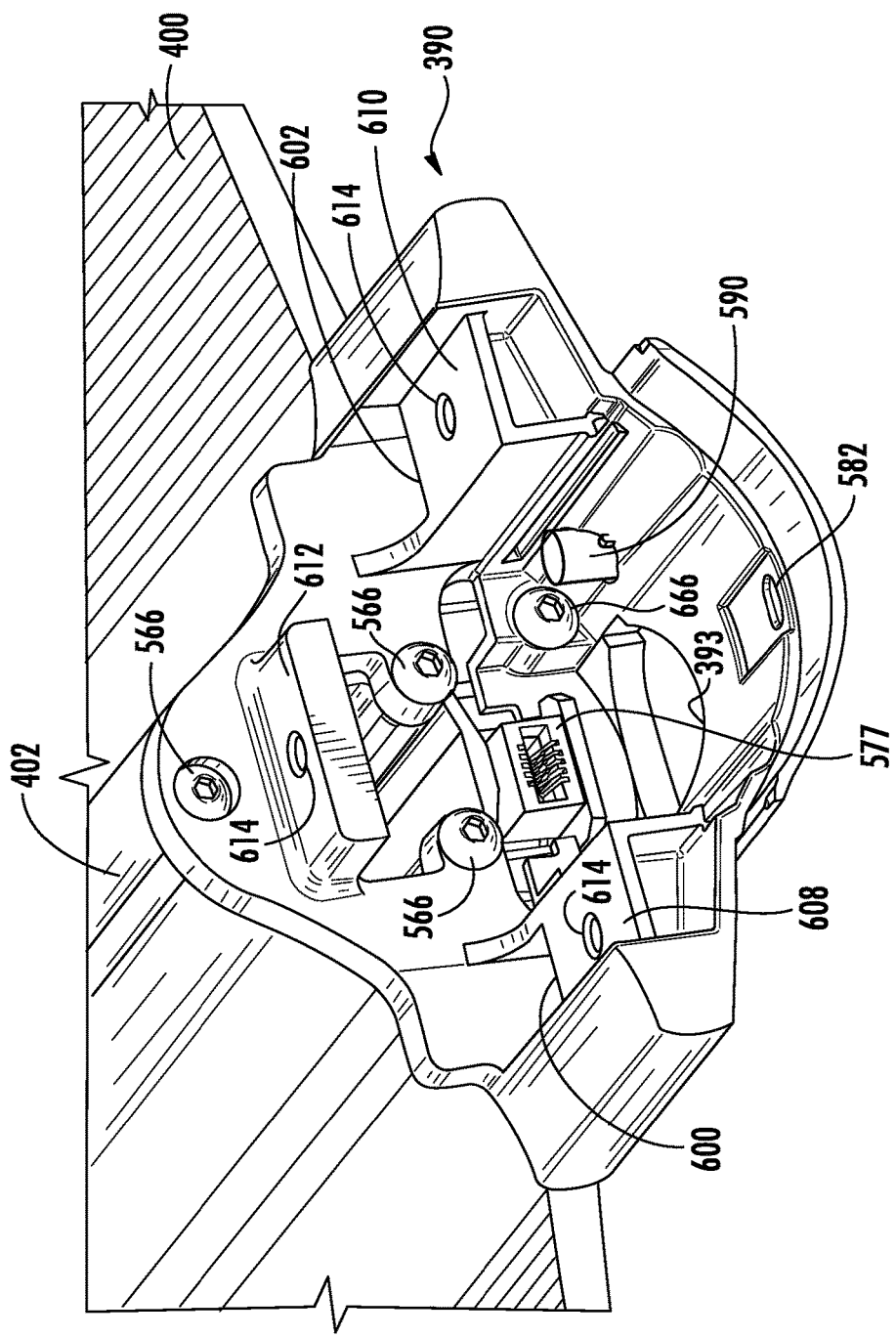
Figure 26C:
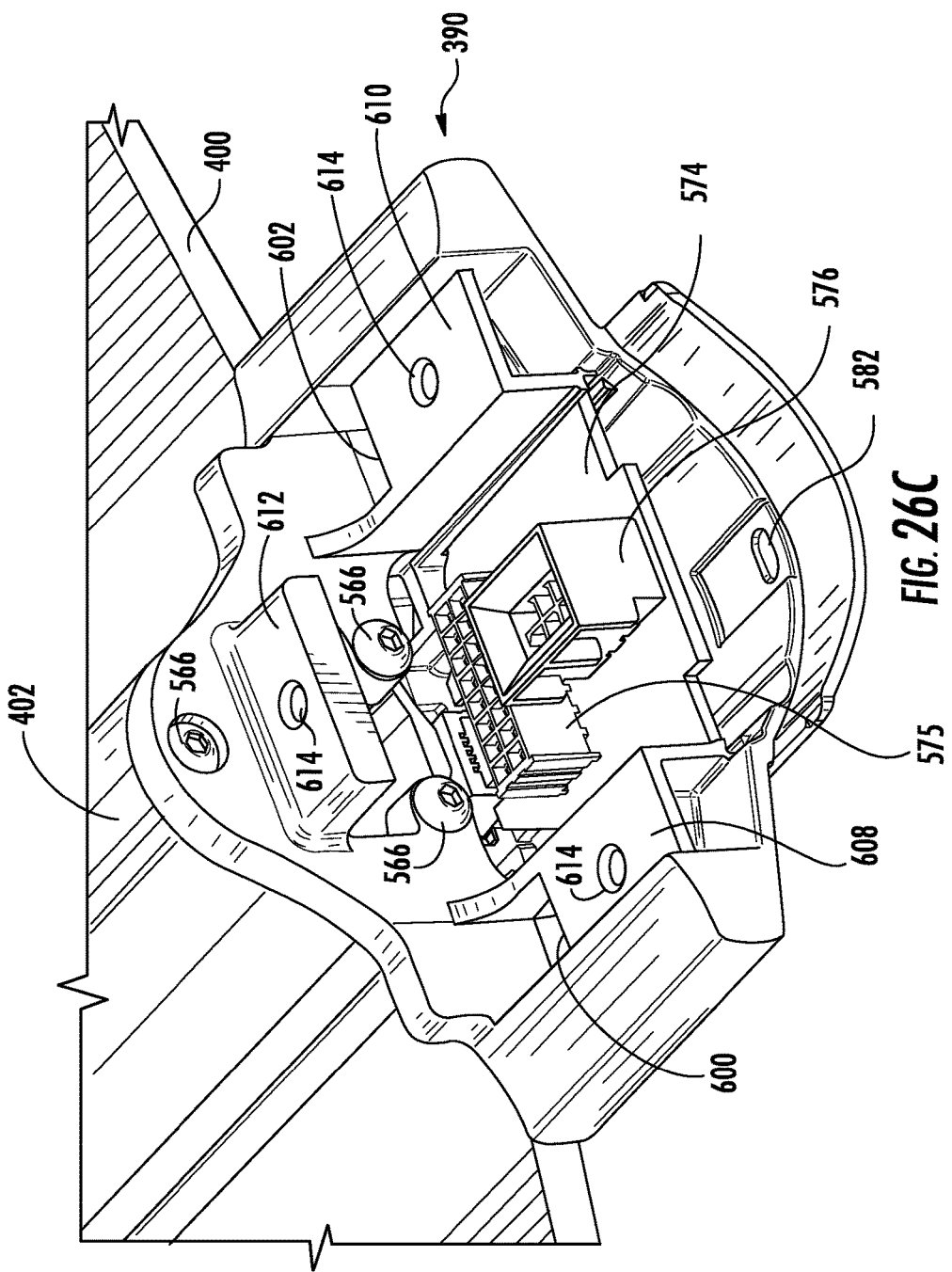
Figure 26D:
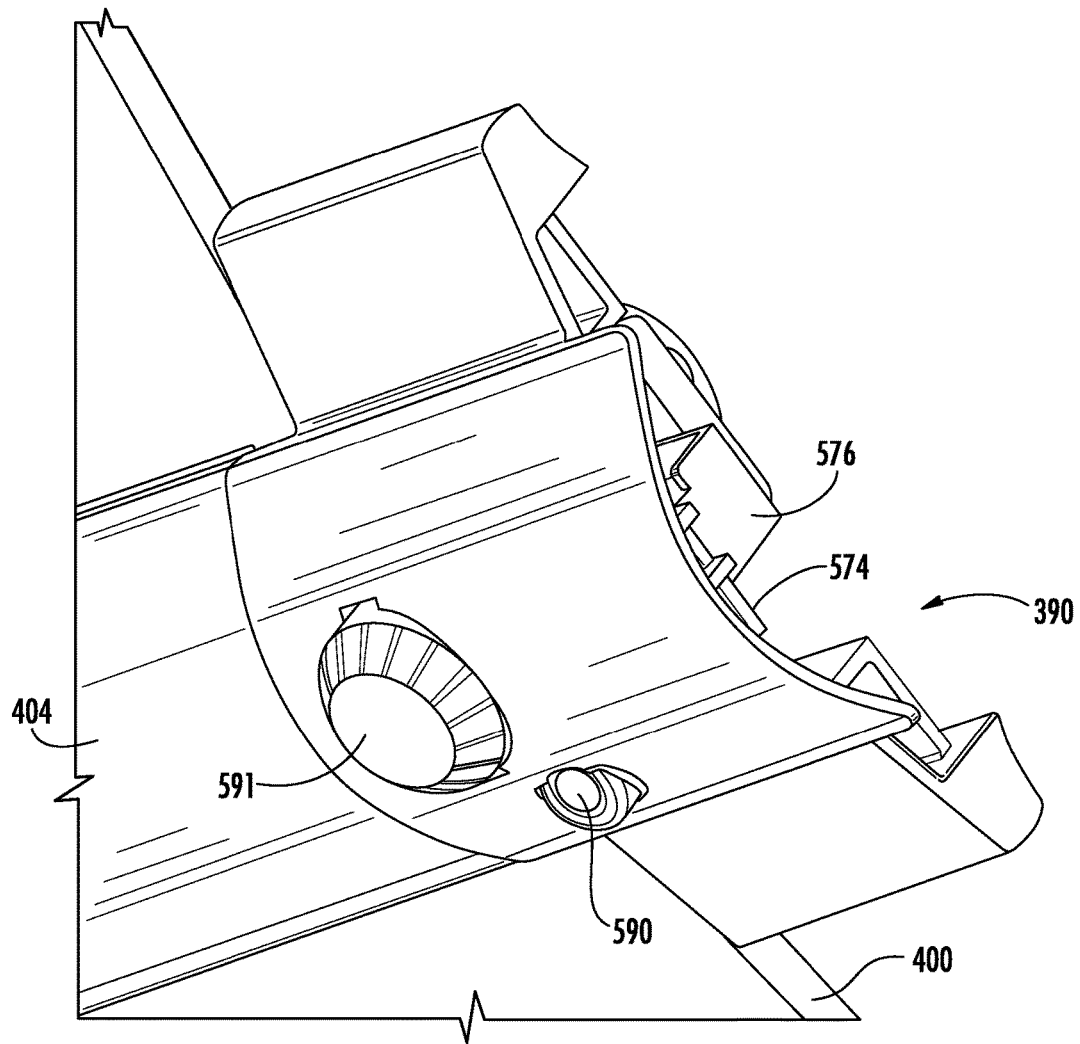
Figure 26E:
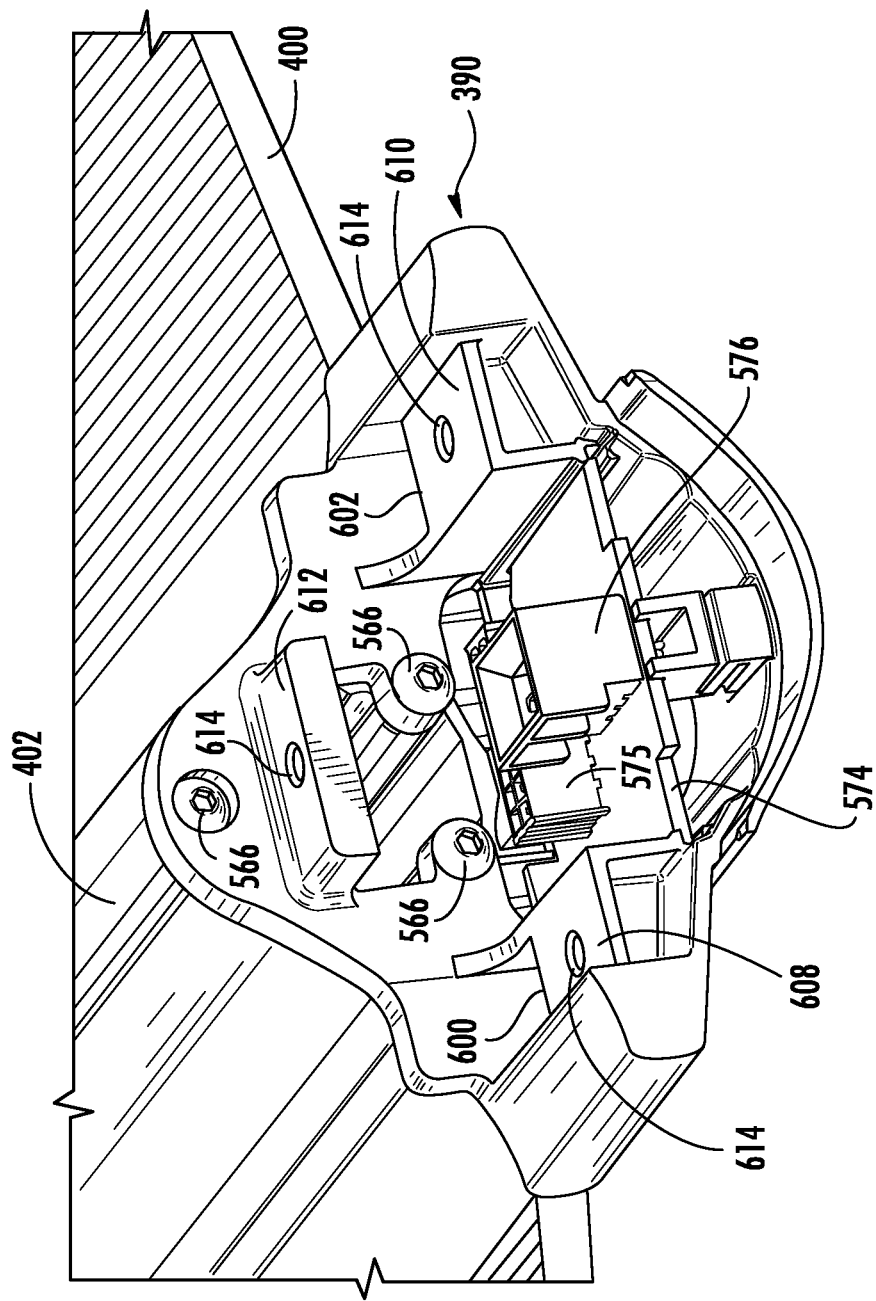
Figure 29:
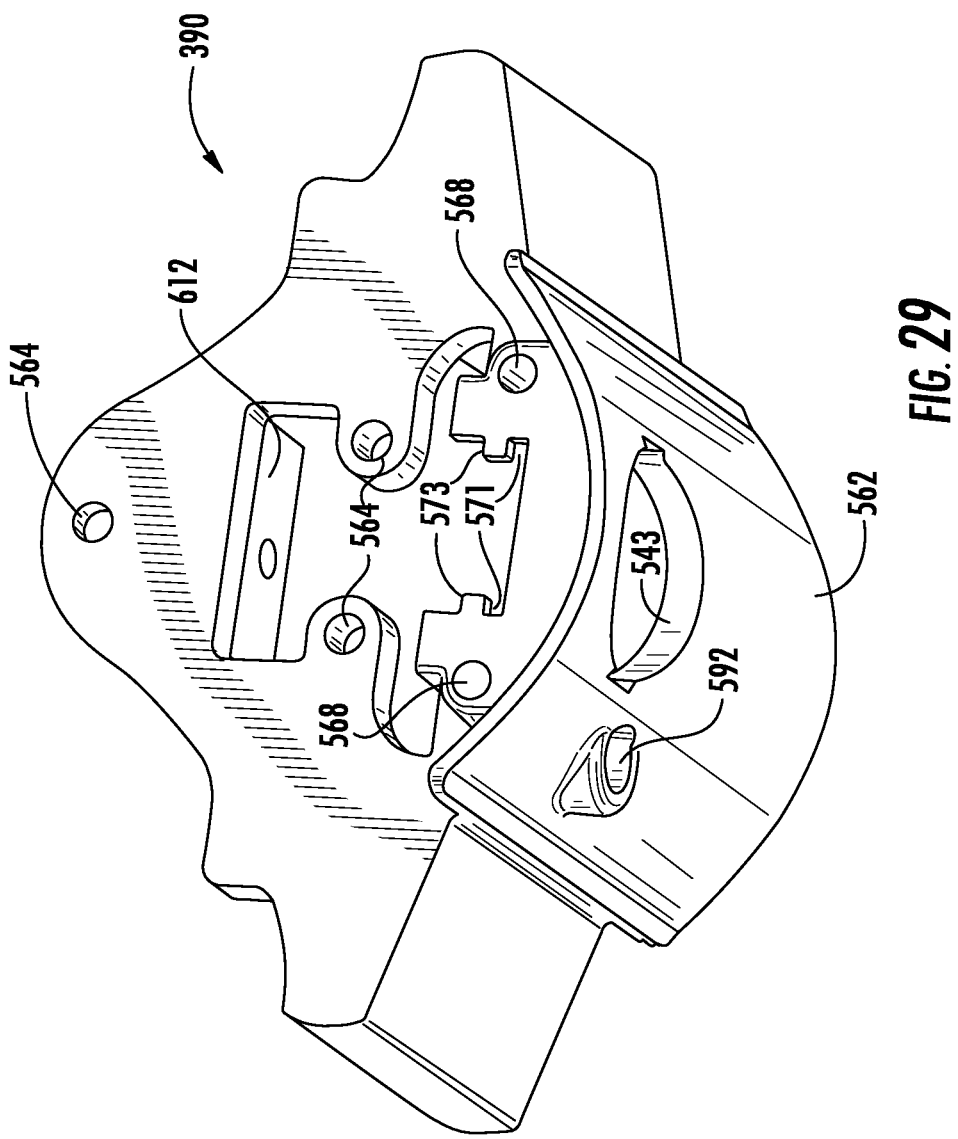
FIG. 29 is another perspective view of the end cap of the luminaire of FIG. 26.
Figure 30:
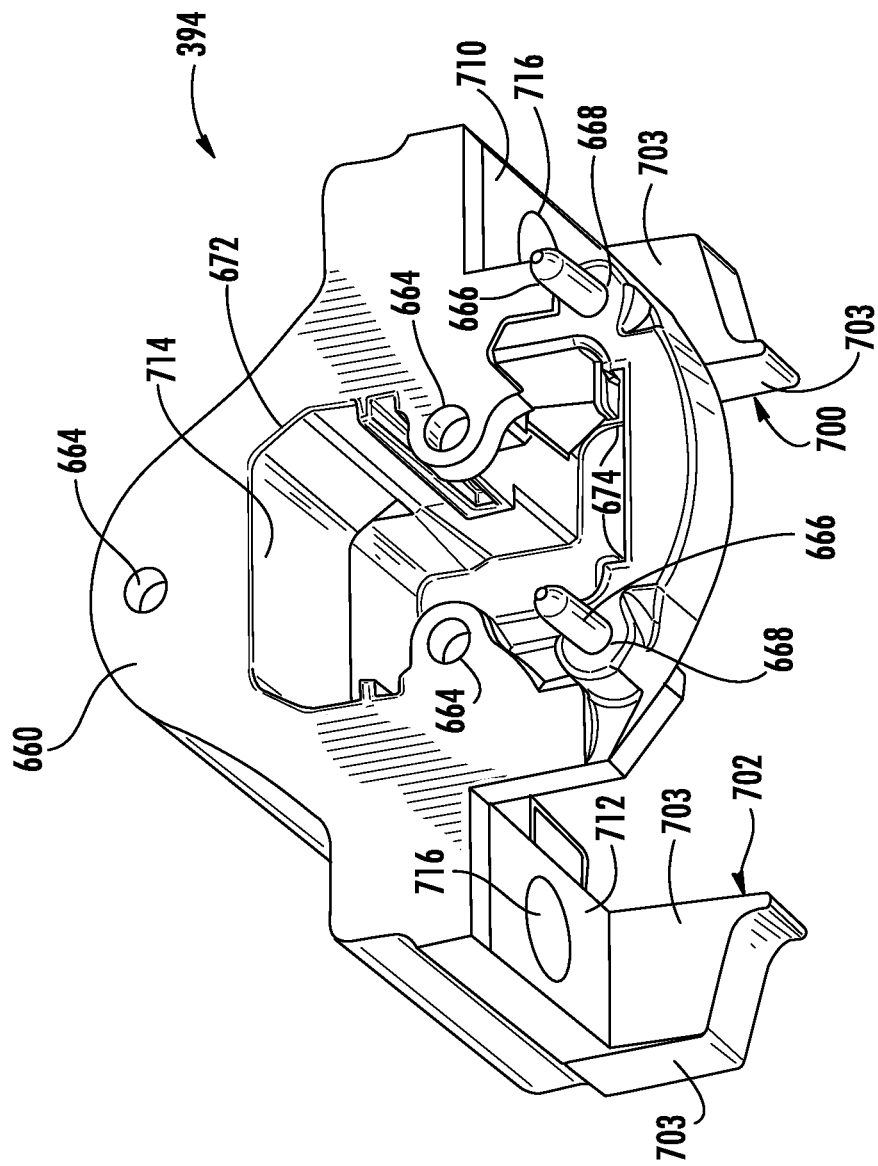
FIG. 30 is a perspective view of the other end cap of the luminaire of FIG. 20.
Figure 31:
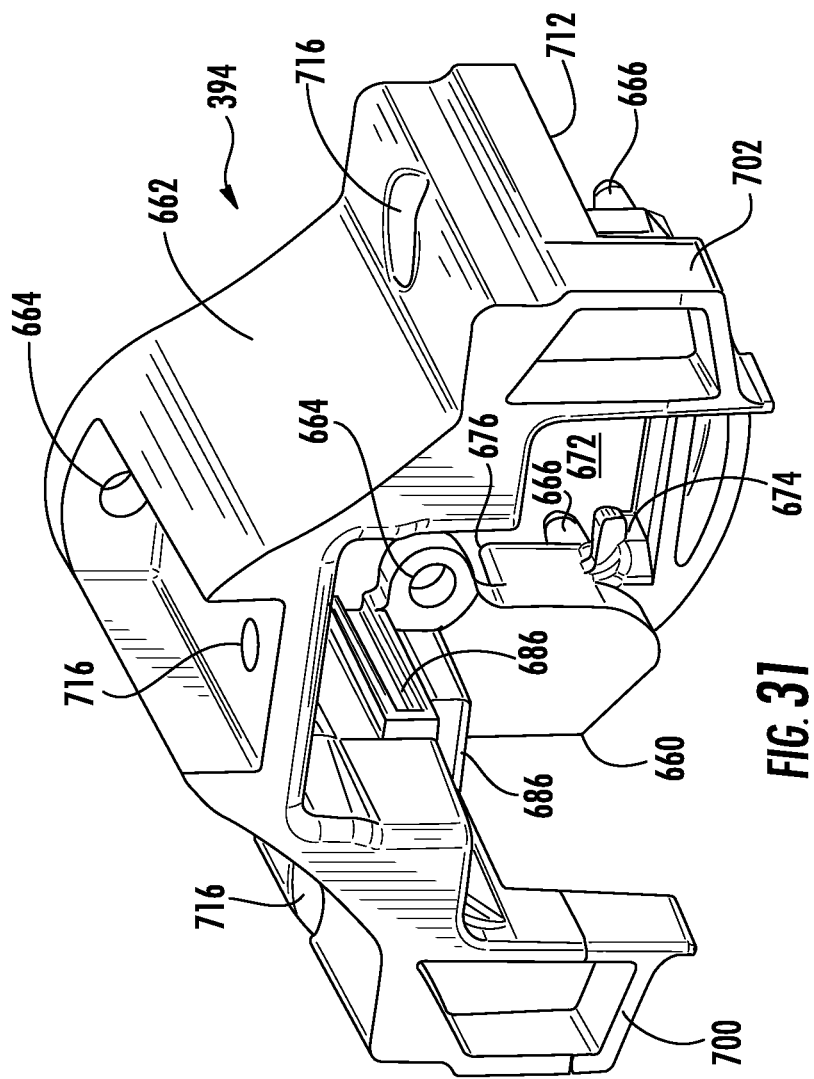
FIG. 31 is another perspective view of the other end cap of the luminaire of FIG. 20.

The first structural member 402 includes an opening 440 that permits access to the hollow interior of the member 402 (FIGS. 20-22). A driver housing 442 that contains one or more components of the drive circuit 403 is disposed within the first structural member 402 and the housing 442 is secured therein in any suitable fashion. The driver housing 442 may comprise an upper housing portion 442a and a lower housing portion 442b that are secured together to retain the drive circuit 403. The driver housing 442 may be retained in the first structural member 402 by any suitable mechanism including separate fasteners, a snap fit connection 443 (FIGS. 22 and 23) or the like. The driver housing 442 may comprise access openings 445 positioned adjacent the ends of the drive circuit 403 that allow access to Ethernet ports 447 formed as part of the drive circuit 403. The openings 445 may be closed by covers 448 where the covers may be secured to the drive housing by a deformable tang 449 that engages a locking member on the upper housing 442a in a snap-fit connection. Cable management channels 451 may be formed in the first structural member 402 for receiving Ethernet and/or power cables for providing power to the luminaire and for transmitting and receiving signals for controlling the luminaire. The covers 448 may be made of plastic or any other non-electrically conductive material that allows transmission of electromagnetic waves therethrough.

The Ethernet ports 447 may be connected to suitable Ethernet cable for delivering power to the luminaire and/or data to and from the luminaire. With an Ethernet cable typically only some of the twisted pairs are used for data transmission such that the remaining twisted pairs may be used for transmitting power. The IEEE 802.3 has standardized two techniques for delivering power over Ethernet referred to Alternative A and Alternative B. Power may be delivered using a standardized or non-standardized technique in addition to that disclosed herein. While power may be delivered over the Ethernet connection, power may also be delivered independently of the data connection such that power may be transmitted to the luminaire over a separate power line and a separate data connection may be made to ports 447. The electrical connector may complete a circuit as required to supply power to the LEDs 420. Two Ethernet ports 447 may be provided with one positioned at each end of the electronics housing 442 toward either end of the luminaire.

One or more communication components forming a part of the light control circuit, such as an RF antenna 443 (FIG. 20) that senses RF energy, may be provided. More generally, the control circuit includes at least one of a network component, an RF component, a control component, and a sensor. In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety. Additionally, any of the luminaire embodiments described herein can include the smart lighting control technologies disclosed in U.S. Provisional Application Ser. No. 62/292,528, titled Distributed Lighting Network, filed concurrently herewith on Feb. 8, 2016 and assigned to the same assignee as the present application, the entirety of this application being incorporated herein by reference. Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control circuitry as described herein The end caps comprise a first end cap 390 secured at a first end of the luminaire and a second end cap 394 secured to a second end of the luminaire. The first end cap 390 on a first luminaire may be secured to the second end cap 394 on a second luminaire to mechanically and/or electrically secure the luminaires together at coupling 374 as shown in FIGS. 18 and 19.

The first end cap 390 is shown in greater detail in FIGS. 25-29. The first end cap 390 may be considered the female connector and comprises receptacles for receiving mating posts on the second end cap 394. In the illustrated embodiment the first end cap 390 comprises an end wall 590 that is configured to close the open ends of the first hollow structural member 402 and the second hollow structural member 404. The end cap 390 further comprises a support wall 562 that extends from the end wall 590 to create a mounting area for supporting lamp electronics and forming a connection area for receiving the mating second end cap 394. The end wall 590 includes apertures 564 for receiving fasteners 566 such as bolts that are inserted through the apertures 564 and threadably engage the first hollow structural member 402. The end wall 590 further includes apertures 568 for receiving fasteners 570 such as bolts that are inserted through the apertures 568 and threadably engage the second hollow structural member 404. The apertures 564, 568 are arranged such that the first hollow structural member 402 is arranged over the second hollow structural member 404 with the waveguide body 400 trapped therebetween. The end wall 590 further includes an aperture 569 that defines a first pair of opposed slots 571 for receiving the edges of the LED board 422. Vertical walls 573 receive an end of the waveguide body 400 to align the waveguide body with the LED board 422 and the first and second structural members.

The first end cap 390 further comprises a pair of opposed slots 572 that receive the lateral edges of PCB 574 such that the PCB is supported in the first end cap 390. The PCB 574 may include an electrical connector 576 that allows the first end cap to be electrically coupled to the second end cap as will be described. The PCB 574 is electrically coupled to the LED board 422 by a suitable electrical connector. For example, an edge connector may be formed at the end of PCB 574 that is inserted into connector 577 or an electrical harness or other electrical connector that plugs into connector 577 may be used such that power may be delivered from the PCB 574 to the LED board 422. A PCB retainer 580 is snapped into the slot 582 to retain and support the PCB 574 in the first end cap 390. The retainer 580 may comprise a spring body 580*a* that is compressed when installed to exert a force on the PCB 574 and tabs 580*b* that hold the edge of the PCB 574 to retain the PCB 574 in the end cap. A light pipe 590 and an OCC lens 591 may be mounted in apertures 592, 593, respectively, in the first end cap. Sensors may be mounted to receive or transmit light or other signals via the light pipe and OCC lens to provide feedback to the controller of the luminaire.

The first end cap 390 may further comprise a first engagement structure that is engaged by a mating second engagement structure on the second end cap 394 to secure a first luminaire 370 to a second luminaire 372. The engagement structure may comprise a first receptacle or mortise 600 and a second receptacle or mortise 602. The receptacles 600, 602 comprise an open upper end defined by sidewalls 604 that extend perpendicular to the longitudinal axis of the lamp. The sidewalls 604 extend substantially perpendicularly to the plane of the LED board 422 and parallel to the insertion direction to define an insertion direction that is transverse to the orientation of the lamp. In one embodiment, the insertion direction into the receptacles 600, 602 extends substantially perpendicular to the longitudinal axis of the lamp such that, for example, when the luminaire is in a horizontal position such as when suspended from a ceiling as illustrated in FIGS. 18 and 19, the insertion direction is vertically downward. The insertion direction may be considered to be normal to the plane of the light emitting portion of the LED assembly which in the illustrated embodiment is normal to the plane of LED board 422. When two luminaires are connected together the luminaires extend in-line with one another where the insertion direction is transverse to the line of the assembled luminaires.

In one embodiment the sidewalls 604 comprise substantially flat surfaces connected at corners such that the receptacles 600, 602 have a substantially rectilinear shape. While receptacles having four sidewalls 604 are shown, the receptacles 600, 602 may have a fewer or greater number of sidewalls and have a prismatic shape. A round or ovate shape may also be used for the receptacles 600, 602 where the walls of the receptacles 600, 602 are parallel to the insertion direction. The use of flat sidewalls that are arranged substantially perpendicular to the longitudinal axis of the luminaire provides surfaces for connecting the first luminaire to the second luminaire such that the luminaires are properly oriented relative to one another when connected.

The engagement structure further comprises guide surfaces that support and align the adjacent luminaires relative to one another. In one embodiment, the guide surfaces 608, 610 comprise flat surfaces disposed adjacent to the receptacles 600, 602 to form a nominally right angle corner between each receptacle and the adjacent guide surface. The arrangement of the receptacles 600, 602 and guide surfaces 608, 610 provide support and alignment of the luminaires relative to one another when connected together. An additional guide surface 612 is provided that is disposed parallel to the guide surfaces 608, 610 to provide three-point support, alignment and connection of the adjacent luminaires. The receptacles 600, 602 and the guide surfaces 608, 610, 612 provide surfaces that align and support the end caps relative to one another along the orthogonal x, y and z axes. Each of guide surfaces 608, 610, 612 may be provided with apertures 614 or other engagement structures for receiving fasteners to secure the adjacent luminaires to one another.

Figure 32:
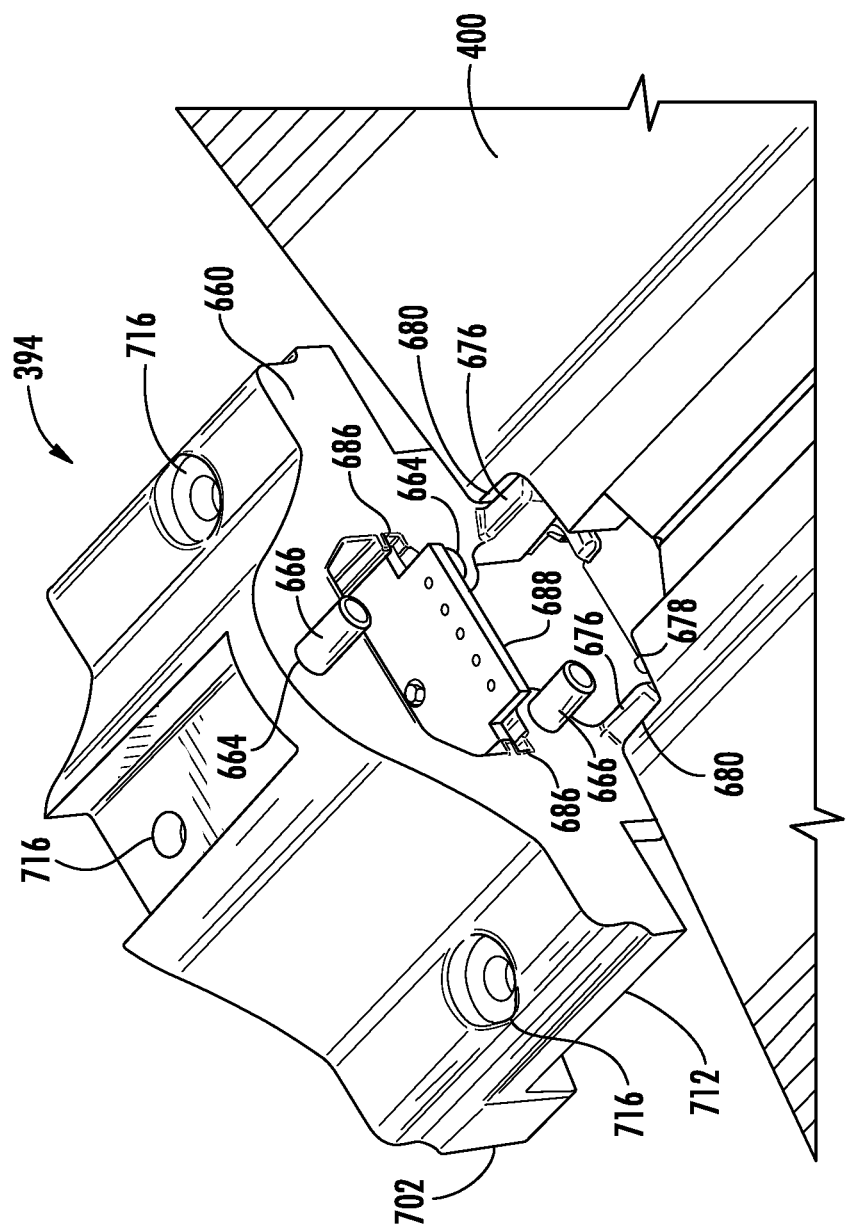
FIG. 32 is a perspective view of the end cap of FIG. 30 in an assembled condition.

The second end cap 394 is shown in greater detail in FIGS. 30-33. The second end cap 394 may be considered the male connector and comprises protrusions or posts for engaging the mating receptacles on the first end cap. In the illustrated embodiment the second end cap 394 comprises an end wall 660 that is configured to close the open end of the first hollow structural member 402 and the second hollow structural member 404. The end cap 394 further comprises a support wall 662 that extends from the end wall 660 to create a mounting area for supporting lamp electronics and forming a connection area for receiving the mating first end cap 390. The end wall 660 includes apertures 664 for receiving fasteners that are inserted into recesses in hollow structural member 402 to support member 402. Pins 666 engage recesses in the second hollow structural member 404 to support member 404. Pins 666 may be replaced by apertures for receiving fasteners to the same purpose. The apertures are arranged such that the first hollow structural member 402 is arranged over the second hollow structural member 404 with the waveguide body 400 trapped therebetween. The end wall 660 further includes an aperture 672 that defines a pair of opposed slots 674 for receiving the edges of the LED board 422. The end wall also includes projections 676 that extend from the side of end wall 660 opposite support wall 662 toward waveguide body 400. The waveguide body 400 comprises a recessed area 678 that receives the projections 676 to align the waveguide body 400 with the LED board and the first and second structural members (FIG. 32).

The second end cap 394 further comprises a pair of opposed slots 686 that receive the lateral edges of PCB 688 such that the PCB is slidably supported in the second end cap 394. The PCB 688 may include a connector 690 that allows the first end cap to be electrically coupled to the second end cap as will be described. The PCB 688 is electrically coupled to the drive circuit 403 by an electrical harness or other electrical connector 689 (FIG. 34B) such that power may be delivered from the PCB 688 to the drive circuit 403.

The second end cap 394 may further comprise an engagement structure that is engaged by the mating engagement structure on the first end cap as described above, to secure a first luminaire to a second luminaire. The engagement structure comprises a first post or tenon 700 and a second post or tenon 702. The posts 700, 702 have an external configuration that allow the posts to be inserted into the receptacles 600, 602 such that the posts are closely received by the receptacles. The posts 700, 702 may each be defined by sidewalls 703 that extend perpendicular to the longitudinal axis of the lamp. The sidewalls 703 extend substantially perpendicularly to the plane of the LED board along the insertion direction. In one embodiment the sidewalls comprise substantially flat surfaces connected at corners such that the posts have a substantially rectilinear shape that mates with the shape of the receptacles 600, 602. While a post having four sidewalls is shown, the post may have a fewer or greater number of sidewalls and have a prismatic shape that mates with the shape of the receptacles 600, 602. A round or ovate shape post may also be used where the sidewall of the posts are parallel to the insertion direction. The use of sidewalls that are arranged substantially perpendicular to the longitudinal axis of the luminaire provides guide surfaces for connecting the luminaires to one another such that the luminaires are properly oriented relative to one another when connected.

The engagement structure further comprises guide surfaces 710, 712 that support and align the adjacent luminaires relative to one another. In one embodiment the guide surfaces 710, 712 comprise flat surfaces disposed adjacent to the posts 700, 702 to form a right angle corner between the posts and the guide surfaces. The arrangement of the posts and guide surfaces provide support and alignment of the luminaires relative to one another when connected together. An additional guide surface 714 is provided that is disposed parallel to the guide surfaces to provide a three-point support, alignment and connection with the adjacent luminaire. Guide surfaces 710, 712, 714 may be provided with apertures 716 that extend through the guide surfaces 710, 712, 714 for receiving fasteners to secure the adjacent luminaires to one another.

In one embodiment power is provided to all of the connected luminaires from a single power supply, either via Ethernet ports 447 or via a separate power cord, such that the connection between the luminaires provides both the mechanical connection and the electrical connection between the luminaires. In another embodiment power is provided to each of the connected luminaires independently such that the connection between the luminaires provides only the mechanical connection between the luminaires.

Reference will be made to FIGS. 35-39 to illustrate a method for interconnecting two luminaires providing only the mechanical connection. A first luminaire having a first end cap 390 is connected to a second luminaire having a second end cap 394. The second luminaire is brought toward the first luminaire in the direction of arrow D such that the second end cap 394 is positioned over the first end cap 390. The posts 700, 702 are positioned over the receptacles 600, 602. The second luminaire is moved downward relative to the first luminaire in the insertion direction as represented by arrow E. As the luminaire is moved in the insertion direction, the posts 700, 702 enter the receptacles 600, 602 and move along the length of the receptacles such that the second end cap 394 is guided into engagement with the first end cap 390. The second end cap 394 is moved in the insertion direction, downward in a typical installation, until the posts 700, 702 are fully seated in the receptacles 600, 602. When the posts 700, 702 are fully seated in the receptacles 600, 602, the guide surfaces 608, 610, 612 on the first end cap 390 abut the guide surfaces 710, 712, 714 on the second end cap 394 such that the first and second luminaires are properly oriented relative to one another and the mechanical connection between the first and second luminaires is complete. In one embodiment the first and second luminaires are disposed in-line with one another such that the luminaires extend in a straight line.

To complete the connection between the first and second luminaires, a fastening mechanism may be used to secure the end caps 390, 394 to one another. In one embodiment, fasteners may be provided that engage the holes formed in the guide surfaces on the first and second end caps. The fasteners may be inserted into through holes 716 formed in the second end cap 394 and engage threaded holes 614 formed in the first end cap 390. In other embodiments, the fasteners may comprise a bolt and nut where the bolt extends through through holes formed in both the first and second end caps such that the exposed end of the bolt may be engaged by the nut. In still other embodiments the end caps may be fastened together by a latch, over-center locking mechanism or other fastening mechanism rather than the separate fasteners.

While the luminaires are fully assembled after the fastening mechanism secures the end caps to one another, the engagement structure of the posts 700, 702 and receptacles 600, 602 allows the joined luminaires to be moved as a unit before the fastening mechanism is secured. The posts 700, 702 engage the receptacles 600, 602 with a relatively small clearance between the posts and the receptacles. As a result, if the joined luminaires are lifted at the outer ends (represented by arrows F in FIG. 19), the luminaires will tilt or cant relative to one another such that the posts 700, 702 are canted in the receptacles 600, 602. The tilting of the posts relative to the receptacles wedges the posts in the receptacles such that the two luminaires are joined together for as long as the luminaires are held in the tilted relationship. This wedging action is beneficial during installation of the lamp. For example the luminaires may be connected to one another as described on a floor or other work surface. The joined luminaires may then be lifted at the ends of the luminaires and installed to a ceiling or other structure where they may be suspended by the cables 384, 386. The fastening mechanism may then be secured to complete the mechanical installation of the luminaires.

Figure 35A:
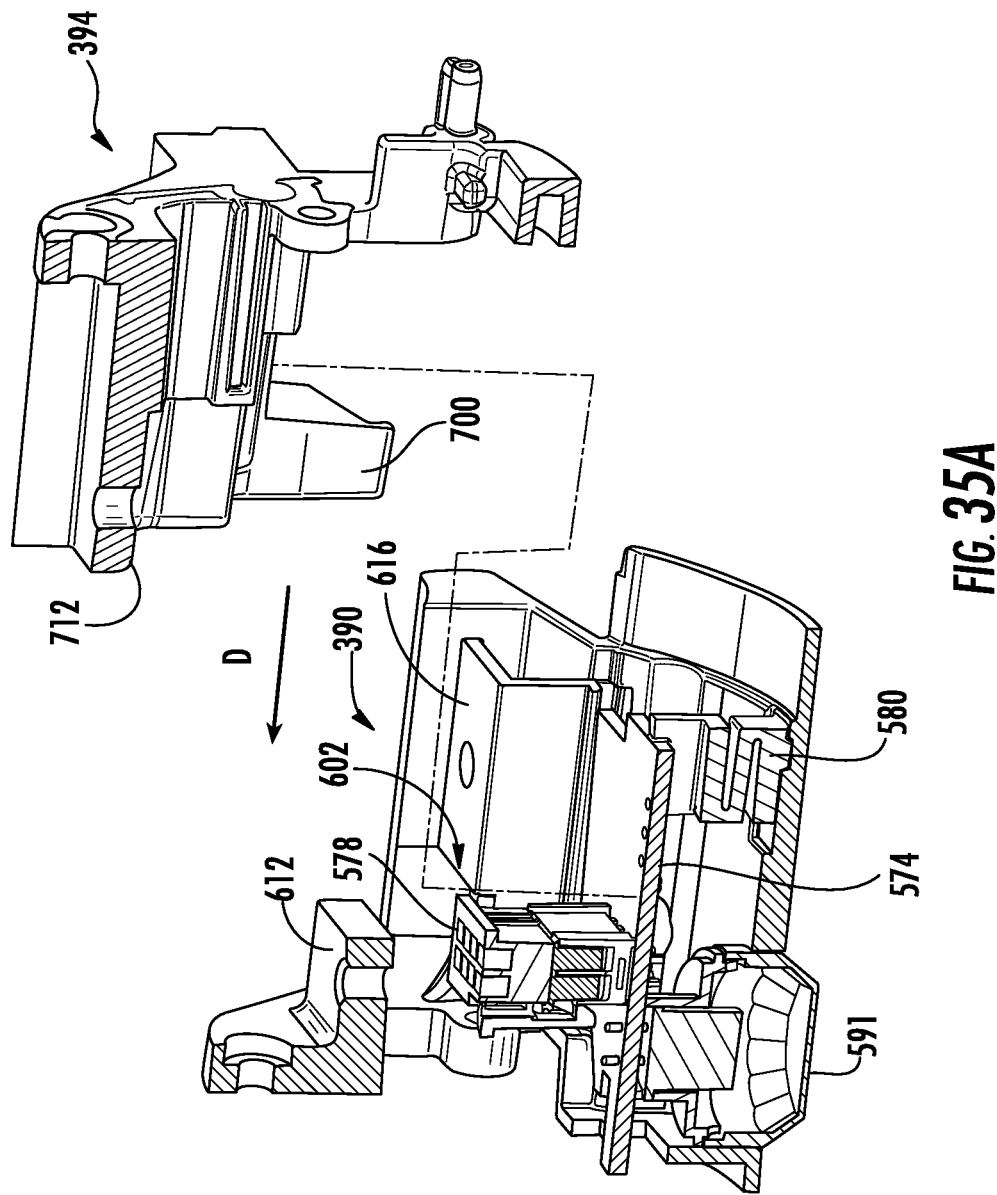
FIGS. 35A-35C are partial perspective section views showing the connection of two end caps.
Figure 35B:
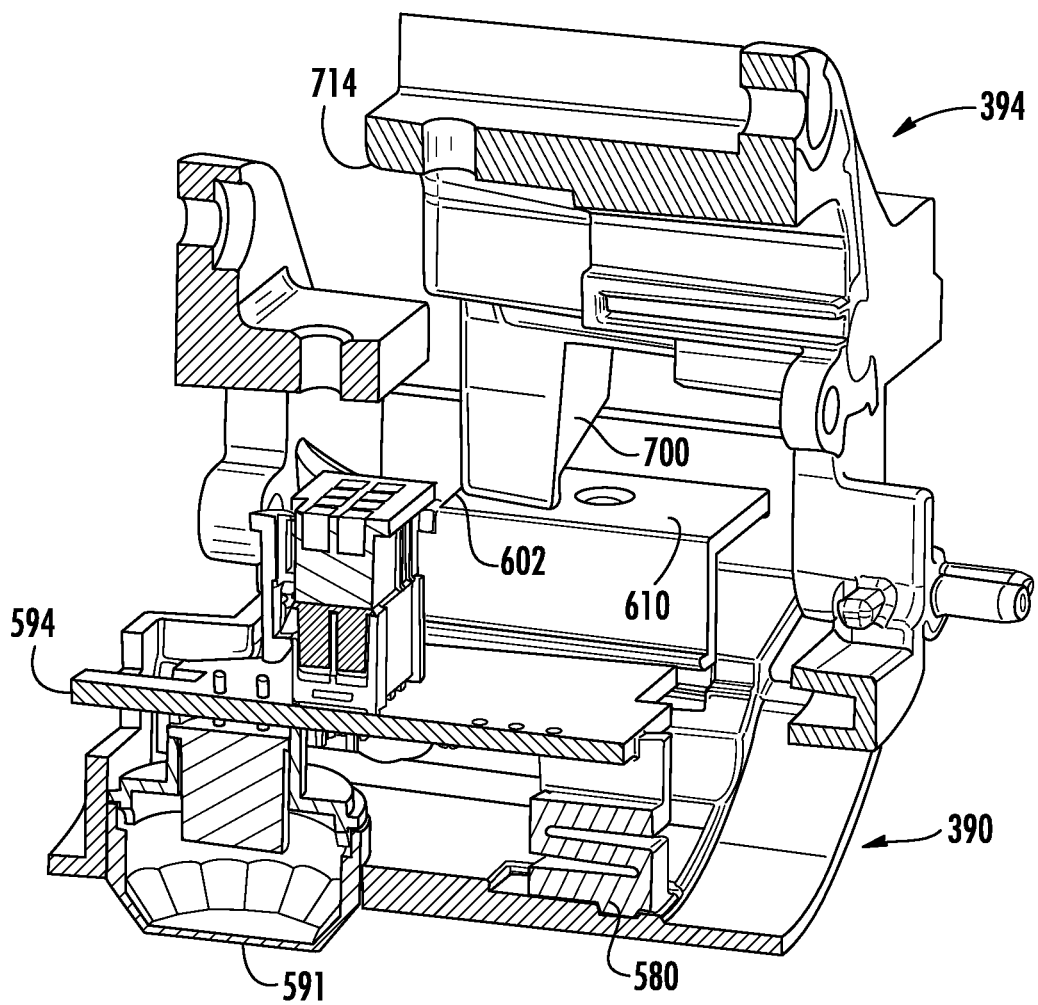
Figure 35C:
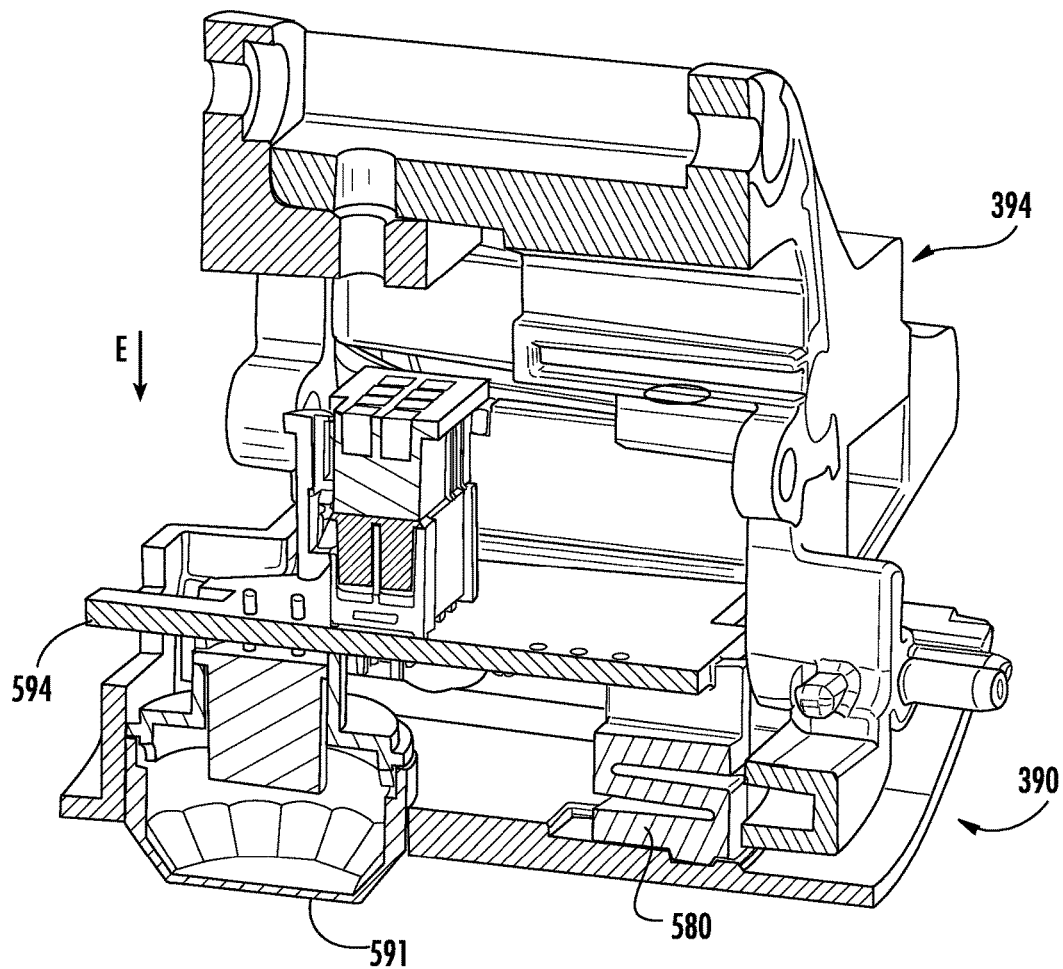
Figure 36:
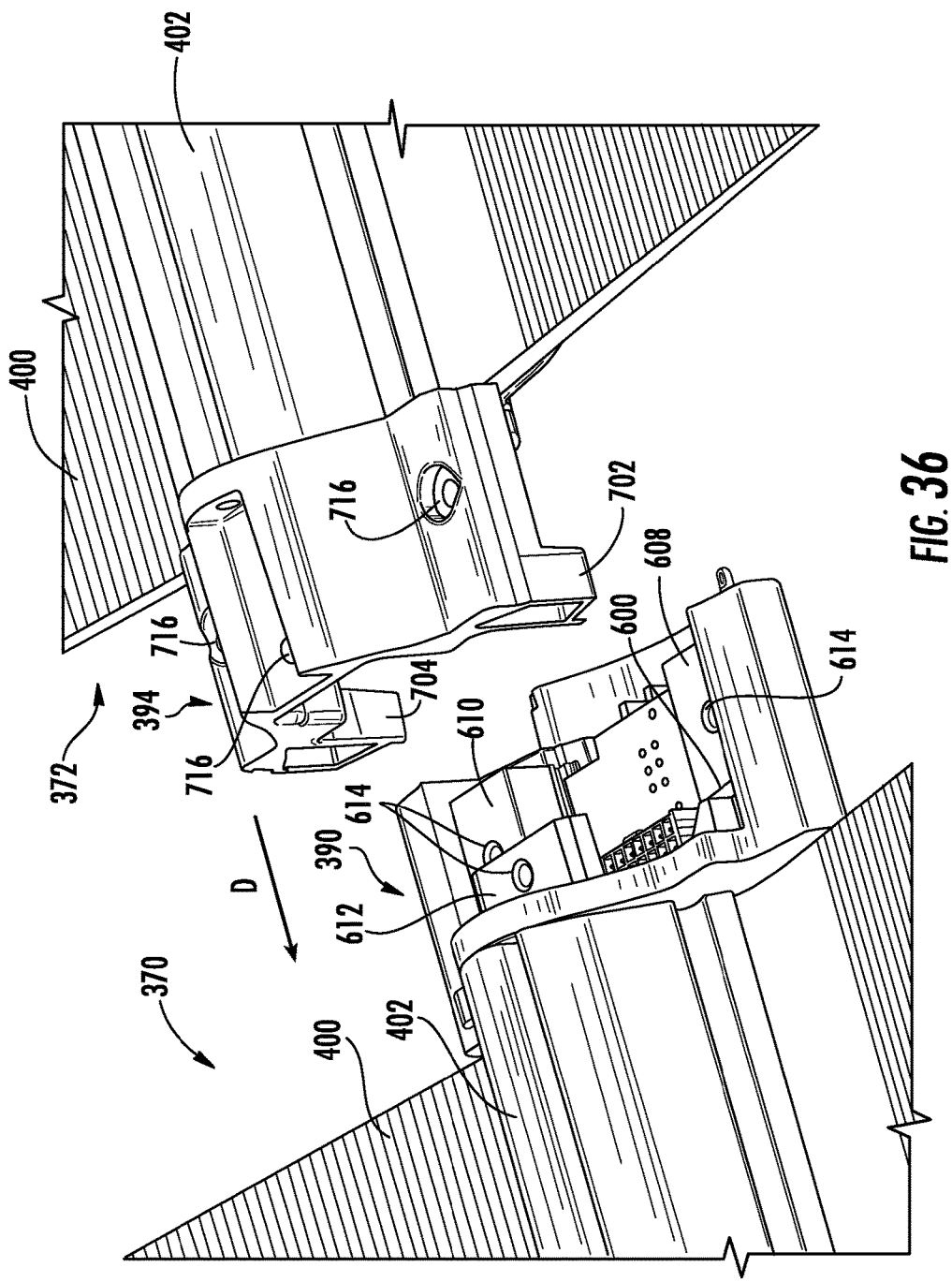
FIGS. 36-38 are partial perspective views showing the connection of two luminaires.
Figure 37:
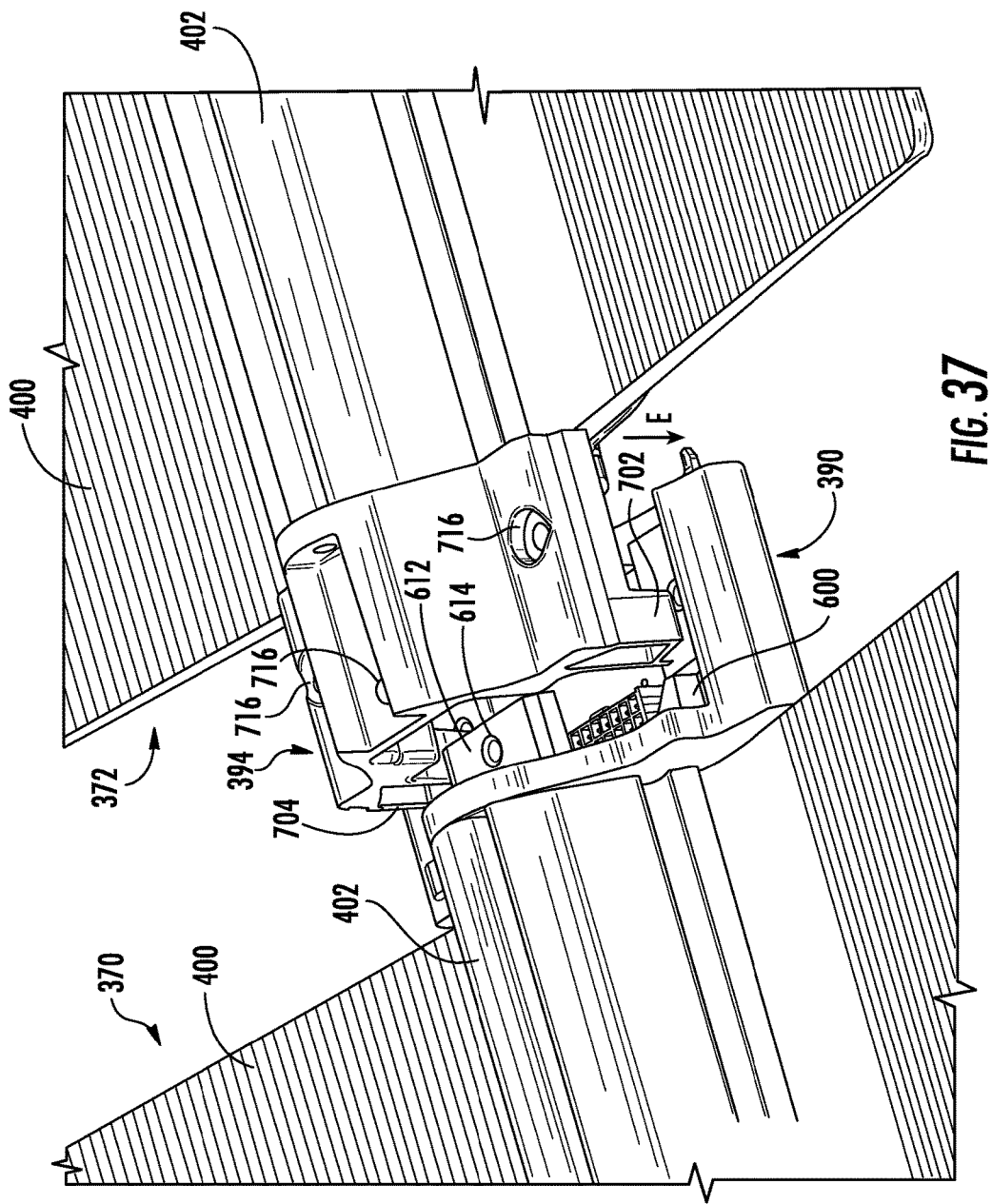
Figure 38:
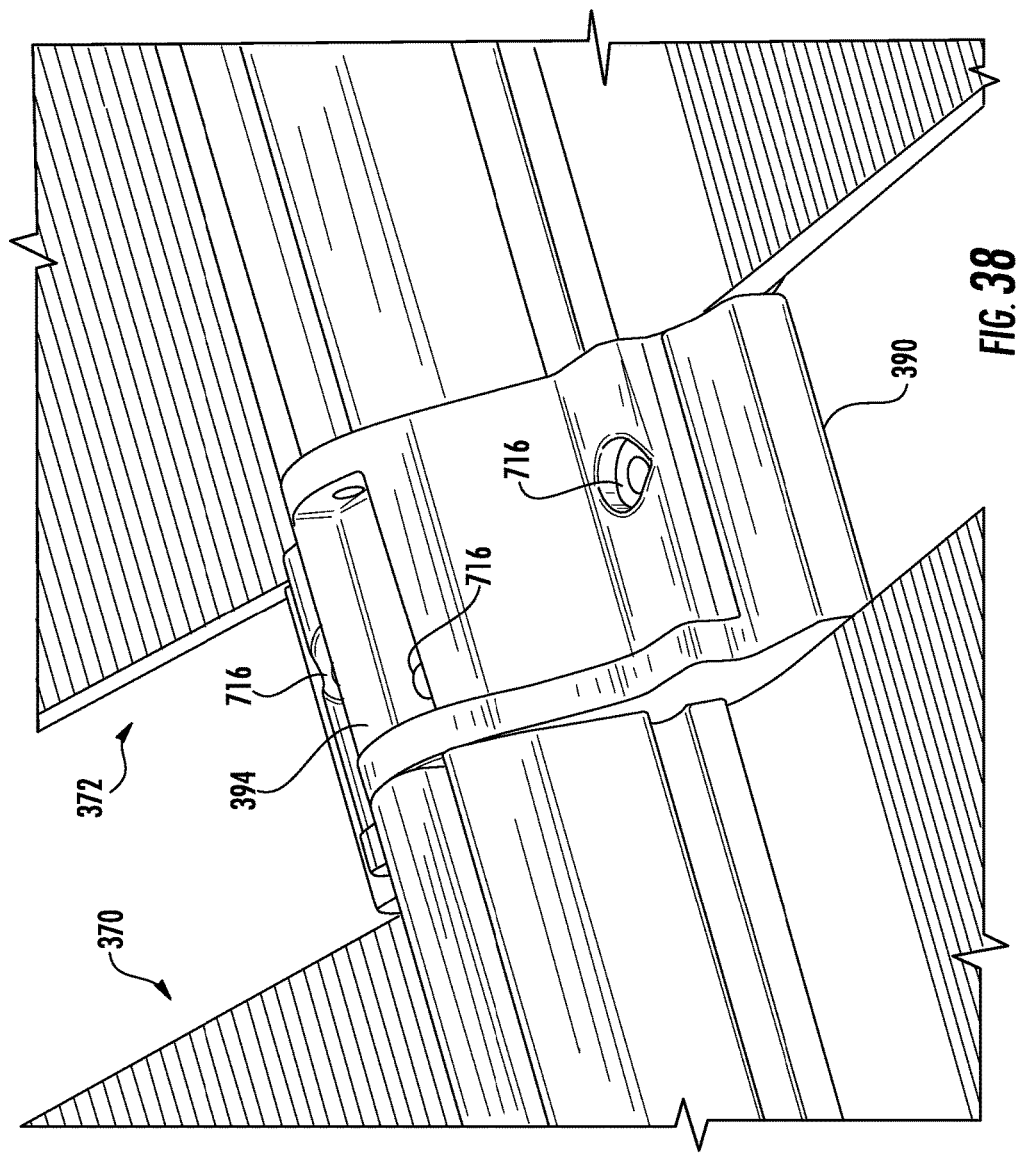

Because the luminaires are easily interconnected and the engagement of the posts and receptacles create a temporary connection the luminaires may be assembled either on the floor or while suspended from a structure such as a ceiling. The arrangement of the three-point connection created by the three mating guide surfaces and three fastening mechanisms makes vertical and horizontal alignment of the interconnected luminaires simple. The mating end caps also overlap with the support wall 662 of one end cap disposed over the support wall 562 in the interconnected assembly to form an outer envelope of the connection as shown in FIGS. 35C and 38.

Figure 34A:
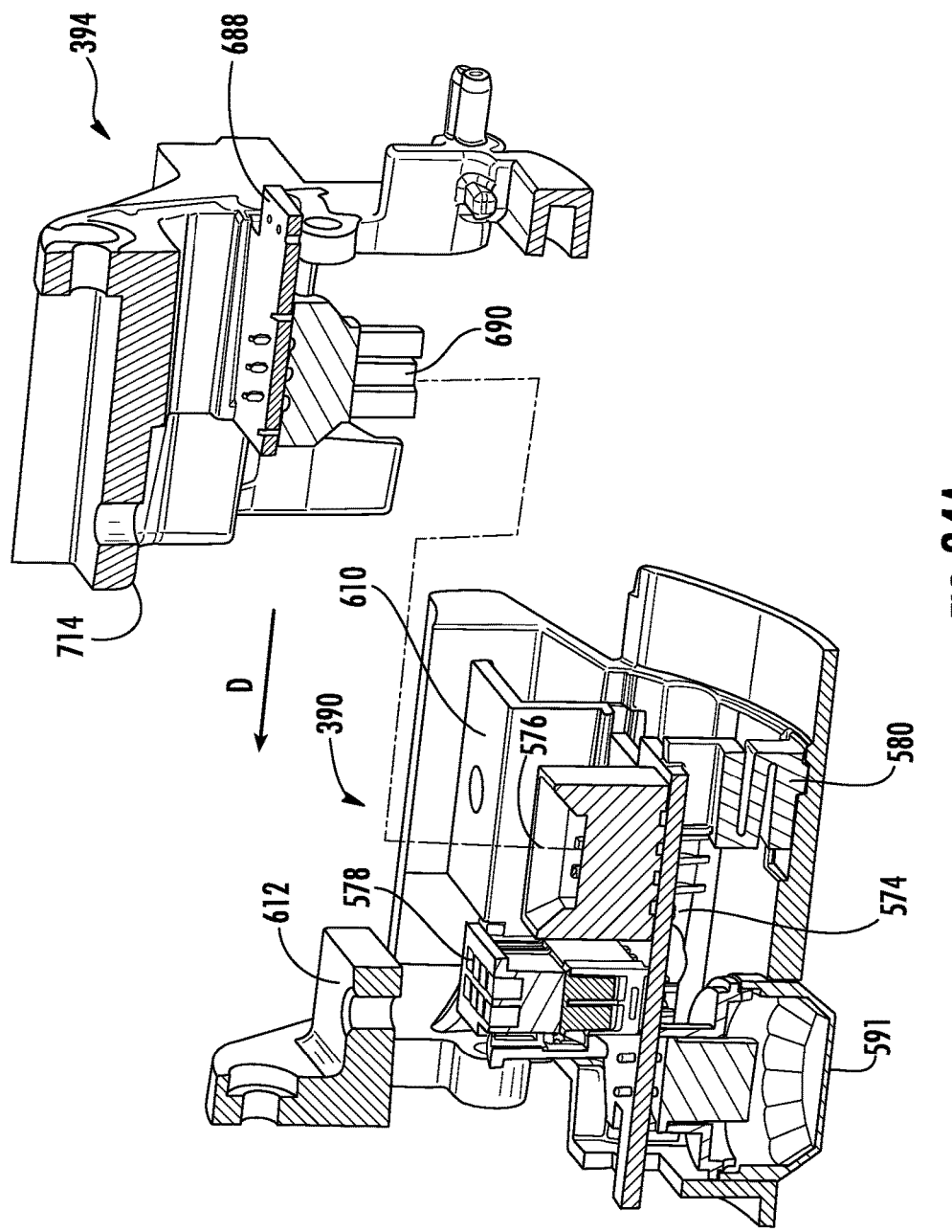
FIGS. 34A-34C are partial perspective section views showing the connection of two end caps.
Figure 34B:
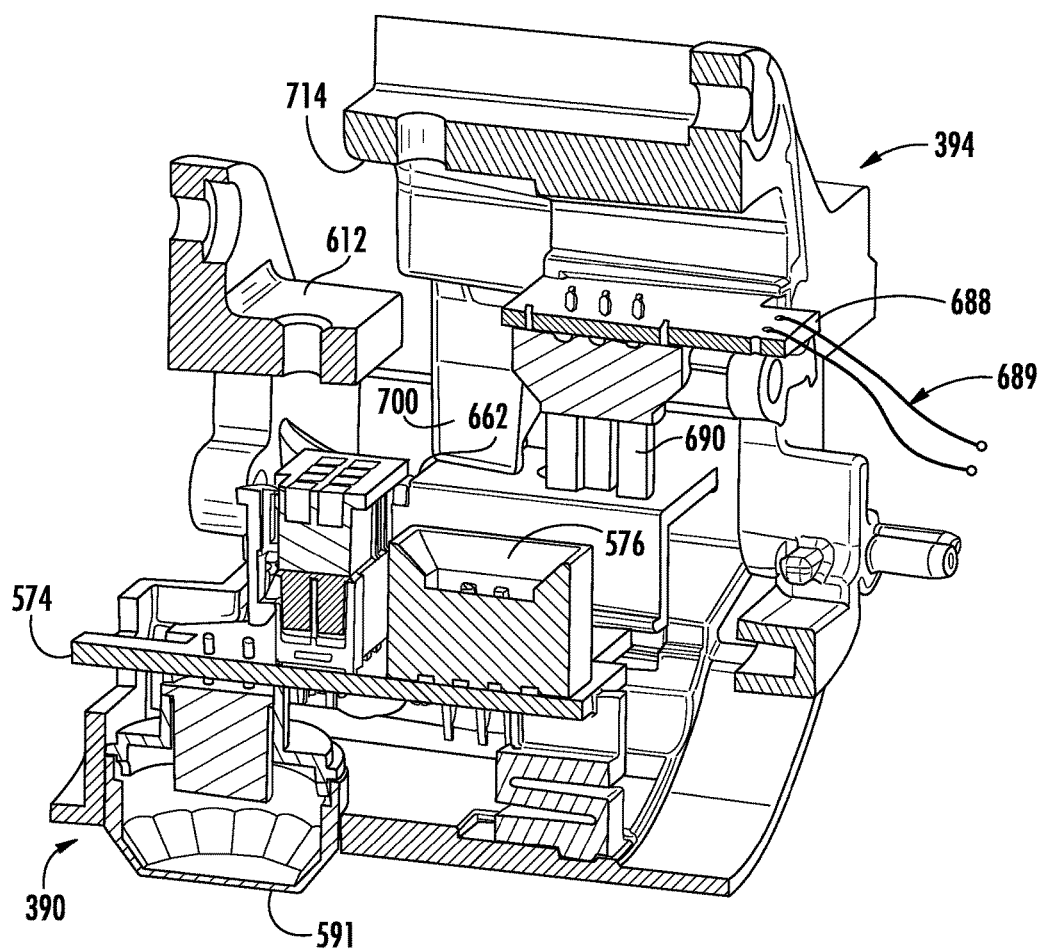
Figure 34C:
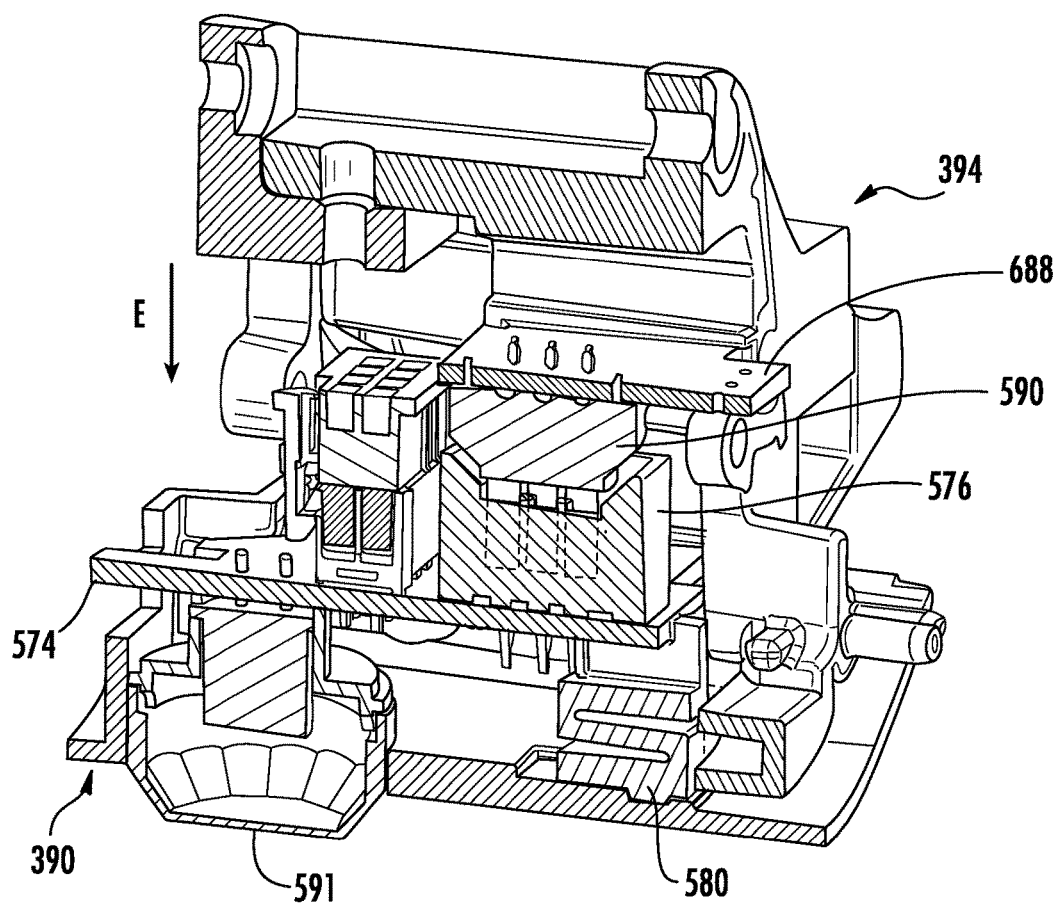

Reference will be made to FIGS. 34A-34C to show the interconnection of two luminaires providing the mechanical and electrical connection. The assembly is similar to that described above except that the electrical connectors are provided to transmit power between the luminaires. A first luminaire having a first end cap 390 is connected to a second luminaire having a second end cap 394. The second luminaire is brought toward the first luminaire such that the second end cap 394 is positioned over the first end cap 390. The posts 700, 702 are positioned over the receptacles 600, 602 and the second luminaire is moved downward relative to the first luminaire in the insertion direction as represented by arrow E as previously described. As the luminaire is moved in the insertion direction, the posts enter the receptacles and move along the length of the receptacles such that the second end cap is guided into engagement with the first end cap. The second end cap 394 is moved in the insertion direction, downward in a typical installation, until the posts 700, 702 are fully seated in the receptacles 600, 602. As the posts are slid into engagement with the receptacles, the pin connectors of the electrical connector 690 on the second end cap 394 are inserted into engagement with the electrical connector 576 on the first end cap 390 to complete the electrical connection between the luminaires. When the posts are fully seated in the receptacles, the guide surfaces 608, 610, 612 on the first end cap 390 abut the guide surfaces 710, 712, 714 on the second end cap 394 such that the first and second luminaires are properly oriented relative to one another. In one embodiment the first and second luminaires are disposed in-line with one another such that the luminaires extend in a straight line. To complete the connection of the first and second luminaires, a fastening mechanism may be used to secure the end caps to one another as previously described.

In the preferred embodiment, each of the luninaires 370, 372 may be approximately 4 feet in length, although each section may be of any other length. Sections of the preferred size are easy to transport, do not noticeably sag, and are readily manufactured and handled. The shapes of the first and second structural members are such that the members do not significantly obstruct emitted light and are light and strong.

It should be noted that other alternatives are possible. For example, LEDs may be disposed on the bottom of the luminaire, but may not be disposed in a structural member, such as a housing, and the electronics including the power circuit C and/or a light control circuit may be disposed above the luminaire within or outside of a structural member, such as in or outside a housing.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body", U.S. patent application Ser. No. 13/840,563, U.S. patent application Ser. No. 14/101,086, filed Dec. 9, 2013, entitled "Optical Waveguides and Luminaires Incorporating Same" by Keller et al., U.S. patent application Ser. No. 14/101,099, filed Dec. 9, 2013, entitled "Optical Waveguide Assembly and Light Engine Including Same" by Yuan et al., U.S. patent application Ser. No. 14/101,132, filed Dec. 9, 2013, entitled "Waveguide Bodies Including Redirection Features and Methods of Producing Same" by Tarsa, U.S. patent application Ser. No. 14/101,147, filed Dec. 9, 2013, entitled "Luminaires Using Waveguide Bodies and Optical Elements" by Keller et al., U.S. patent application Ser. No. 14/101,129, filed Dec. 9, 2013, entitled "Simplified Low Profile Module with Light Guide for Pendant, Surface Mount, Wall Mount, and Stand Alone Luminaires" by Tarsa et al., U.S. patent application Ser. No. 14/101,051, filed Dec. 9, 2013, entitled "Optical Waveguide and Lamp Including Same" by Yuan et al. and International Application No. PCT/US14/13931, filed Jan. 30, 2014, entitled "Optical Waveguides and Luminaires Incorporating Same", incorporated by reference herein and owned by the assignee of the present application may be used in the devices disclosed herein. Thus, for example, any of the waveguides or luminaires disclosed herein may include one or more coupling features or optics, a modified LED arrangement, one or more light redirection features, one or more extraction features, and/or particular waveguide or overall luminaire shapes and/or configurations as disclosed in such applications, as necessary or desirable. Other luminaire and waveguide form factors than those disclosed herein are also contemplated.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A luminaire comprising:
a light emitting portion extending between a first end cap and a second end cap to define a length between the first end cap and the second end cap;
the first end cap comprising at least one receptacle extending in an insertion direction and the second end cap comprising at least one post extending in the insertion direction, the at least one receptacle of the first end cap being configured to closely receive a post on a third end cap and the at least one post of the second end cap being configured to be received in a receptacle on a fourth end cap, the insertion direction being disposed transversely to the length;
wherein the first end cap further comprises at least one first guide surface and the second end cap further comprises at least one second guide surface, the at least one first guide surface being configured to engage at least one third guide surface on the third end cap and the at least one second guide surface being configured to engage at least one fourth guide surface on the fourth end cap, the at least one first guide surface and the at least one second guide surface being rigid and disposed perpendicularly to the insertion direction such that the engagement of the at least one first guide surface with the at least one third guide surface prevents movement of the first end cap relative to the third end cap in the insertion direction, and wherein the first end cap comprises a first electrical connector separate from the at least one first guide surface configured to engage a second electrical connector on the third end cap.

2. The luminaire of claim 1 wherein the first end cap is connected to a first structural member and a second structural member and the second end cap is connected to the first structural member and the second structural member such that a waveguide body is disposed between the first structural member and the second structural member.

3. The luminaire of claim 1 wherein the at least one receptacle of the first end cap comprises sidewalls that extend along the insertion direction.

4. The luminaire of claim 1 wherein the at least one receptacle of the first end cap, the at least one first guide surface and the at least one second guide surface provide alignment and support along orthogonal x, y and z axes.

5. The luminaire of claim 1 wherein the second end cap comprises a third electrical connector.

6. The luminaire of claim 1 wherein the light emitting portion comprises at least one LED and a drive circuit for the at least one LED, the drive circuit comprising an Ethernet port.

7. The luminaire of claim 6 wherein the Ethernet port delivers power to the drive circuit.

8. The luminaire of claim 6 further comprising a second Ethernet port spaced from the Ethernet port along the length of the light emitting portion.

9. A luminaire assembly comprising:
a first luminaire having a first light emitting portion extending between a first end cap and a second end cap to define a first length between the first end cap and the second end cap, a second luminaire having a second light emitting portion extending between a third end cap and a fourth end cap to define a second length between the third end cap and the fourth end cap, the first end cap being configured to connect to the fourth end cap;
the first end cap comprising at least one post extending in an insertion direction and the fourth end cap comprising at least one receptacle extending in the insertion direction, the insertion direction being disposed transversely to the first length and the second length;

wherein the first end cap further comprises at least one first guide surface and the fourth end cap comprises at least one second guide surface, the at least one first guide surface engaging the at least one second guide surface when the at least one post is inserted in the at least one receptacle, the at least one first guide surface and the at least one second guide surface being disposed perpendicularly to the insertion direction such that the engagement of the at least one first guide surface with the at least one second guide surface prevents movement of the first end cap relative to the fourth end cap in the insertion direction; and a fastening mechanism securing the first end cap to the fourth end cap.

10. The luminaire assembly of claim 9 wherein the first end cap and the third end cap are substantially identical and the second end cap and the fourth end cap are substantially identical.

11. The luminaire assembly of claim 9 wherein the first length and the second length are disposed in-line with one another when the first end cap is connected to the fourth end cap.

12. The luminaire of claim 9 wherein the at least one receptacle comprises sidewalls that extend along the insertion direction.

13. The luminaire of claim 9 wherein the at least one post is closely received in the at least one receptacle such that a force exerted on the first luminaire and the second luminaire cants the at least one post in the at least one receptacle to join the first luminaire to the second luminaire due to the binding force between the at least one receptacle and the at least one post.

14. A method of assembling a luminaire assembly comprising a first luminaire having a first light emitting portion extending between a first end cap and a second end cap to define a first length between the first end cap and the second end cap, a second luminaire having a second light emitting portion extending between a third end cap and a fourth end cap to define a second length between the third end cap and the fourth end cap, the first end cap being configured to connect to the fourth end cap; the first end cap comprising at least one post extending in an insertion direction and the fourth end cap comprising at least one receptacle extending in the insertion direction, the insertion direction being disposed transversely to the first length and the second length, the method comprising:

positioning the first end cap and the fourth end cap vertically over one another;

moving the first end cap relative to the fourth end cap in the insertion direction;

inserting the at least one post into the at least one receptacle to connect the first end cap to the fourth end cap;

mounting the first luminaire and the second luminaire to a support surface after the first end cap is connected to the fourth end cap;

aligning a first hole on the first end cap with a second hole on the fourth end cap, the first hole and the second hole being configured to receive a common fastening mechanism.

15. The method of claim 14 wherein the step of inserting the at least one post into the at least one receptacle comprises abutting at least one first guide surface on the first end cap with at least one second guide surface on the fourth end cap where the at least one first guide surface and the at least one second guide surface are perpendicular to the insertion direction.

16. The method of claim 14 wherein the step of inserting the at least one post into the at least one receptacle comprises connecting an electrical connector on the first end cap with a mating electrical connector on the fourth end cap to complete an electrical connection between the first luminaire and the second luminaire.

17. A luminaire comprising:

a light emitting portion extending between a first end cap and a second end cap to define a length between the first end cap and the second end cap along a first direction;

the first end cap comprising at least one receptacle extending in an insertion direction and the second end cap comprising at least one post extending in the insertion direction, the insertion direction being disposed transversely to the length, the at least one receptacle having an internal shape and a first dimension in the first direction and the at least one post having an external shape that is the same as the internal shape and a second dimension in the first direction that is slightly smaller than the first dimension;

the first end cap further comprising a first guide surface and a second guide surface that are disposed perpendicularly to the insertion direction, the first guide surface defining a first plane and being positioned adjacent to the at least one receptacle such that the at least one receptacle extends below the first plane defined by the first guide surface along the insertion direction, and the second end cap comprising a third guide surface and a fourth guide surface that are disposed perpendicularly to the insertion direction, the third guide surface defining a second plane and being positioned adjacent to the at least one post such that the at least one post extends above the second plane defined by the third guide surface along the insertion direction, wherein the first guide surface is spaced from the second guide surface along the insertion direction and the first guide surface and the second guide surface are arranged to engage a fifth guide surface and a sixth guide surface of a third end cap, respectively, and the third guide surface and the fourth guide surface are arranged to engage a seventh guide surface and an eighth guide surface of a fourth end cap, respectively.

* * * * *